US006648583B1

(12) United States Patent
Roy et al.

(10) Patent No.: US 6,648,583 B1
(45) Date of Patent: Nov. 18, 2003

(54) PARALLEL KINEMATICS MECHANISM WITH A CONCENTRIC SPHERICAL JOINT

(76) Inventors: Shambhu Nath Roy, 503 E. Stoughton, #6, Champaign, IL (US) 61820; Michael Merz, Tannenstr 41, 53913 Swisttal (DE)

( * ) Notice: Subject to any disclaimer, the term of this patent is extended or adjusted under 35 U.S.C. 154(b) by 0 days.

(21) Appl. No.: 10/278,701

(22) Filed: Oct. 23, 2002

Related U.S. Application Data

(62) Division of application No. 09/368,856, filed on Aug. 5, 1999, now Pat. No. 6,497,548.

(51) Int. Cl.[7] ................................................ B25J 17/02

(52) U.S. Cl. .......................... 414/735; 403/53; 403/58; 901/29; 74/490.06

(58) Field of Search ............................ 414/735; 901/28, 901/29; 74/490.05, 490.06; 403/52, 53, 57, 58

(56) References Cited

U.S. PATENT DOCUMENTS

| 4,776,749 | A | 10/1988 | Wanzenberg et al. |
|---|---|---|---|
| 4,790,718 | A | 12/1988 | Vickers |
| 5,179,525 | A | 1/1993 | Griffis et al. |
| 5,279,176 | A | 1/1994 | Tahmasebi et al. |
| 5,466,085 | A | 11/1995 | Sheldon et al. |
| 5,656,905 | A | 8/1997 | Tsai |
| 5,657,584 | A | 8/1997 | Hamlin |
| 5,709,553 | A | 1/1998 | Opfer et al. |
| 5,797,191 | A | 8/1998 | Ziegert |

OTHER PUBLICATIONS

Fichter, "A Stewart Platform–Based Manipulator: General Theory and Practical Construction," *The International Journal on Robotics Research*, 5, 157–182 (1986).

Nanua et al., "Direct Kinematic Solution of a Stewart Platform," *IEEE Transactions on Robotics and Automation*, 6 (4), 438–443 (1990).

Zhang et al., "Forward Kinematics of a Class of Parallel (Stewart) Platforms with Closed–Form Solutions," *Proceedings of the 1991 IEEE International Conference on Robotics and Automation*, 2676–2681 (1991).

Gosselin et al., "The agile eye: a high–performance three–degree–of–freedom camera–orienting device," *Proceedings of the 1994 IEEE International Conference on Robotics and Automation*, 781–786 (1994).

Hamlin et al., "A Novel Concentric Multilink Spherical Joint with Parallel Robotics Applications," *Proceedings of the 1994 IEEE International Conference on Robotics and Automation*, 1267–1272 (1994).

Hamlin et al., "Tetrobot: A Modular System for Hyper–Redundant Parallel Robotics," *Proceedings of 1995 IEEE International Conference on Robotics and Automation*, 154–159 (1995).

Kang et al., "Robust Tracking Control of Stewart Platform," *Proceedings of the 35th IEEE Conference on Decision and Control*, 3014–3019 (1996).

(List continued on next page.)

*Primary Examiner*—Donald W. Underwood

(57) ABSTRACT

A parallel kinematics mechanism is provided for uses such as robotics or machining. The mechanism has various limbs, at least some of which are actuatable, for moving an end component with multiple degrees of freedom. The mechanism advantageously facilitates a closed-form solution for the forward kinematics. A joint assembly is provided for use in the parallel kinematics mechanism, the joint assembly having a plurality of revolute joints for connecting to at least three limbs, the joints having non-parallel axes, which intersect at a common point. In various embodiments of the invention, the end component has three, four, five and six degrees of freedom.

18 Claims, 14 Drawing Sheets

OTHER PUBLICATIONS

Kim et al., "RCC Characteristics of Planar/Spherical Three Degree of Freedom Parallel Mechanisms with Joint Compliances," *Proceedings of the 1996 IEEE/RSJ International Conference on Intelligent Robots and Systems (IROS 96) Robotic Intelligence Interacting with Dynamic Worlds*, 360–367 (1996).

Bruyninckx, "The 321–HEXA: A Fully–Parallel Manipulator with Closed–Form Position and Velocity Kinematics," *Proceedings of the 1997 IEEE International Conference on Robotics and Automation*, 2657–2662 (1997).

Yang et al., "Closed Form Forward Kinematics Solution to a Class of Hexapod Robots," *IEEE Transactions on Robotics and Automation, 14*, (3), 503–508 (1998).

PARALLEL KINEMATICS MECHANISM WITH A CONCENTRIC SPHERICAL JOINT

This patent application is a divisional of U.S. patent application Ser. No. 09/368,856, filed Aug. 5, 1999, now U.S. Pat. No. 6,497,548, granted Dec. 24, 2002

The present invention generally relates to an apparatus for positioning and orienting a member in space and to joints for linking limbs of such an apparatus.

BACKGROUND

A need exists for simple and effective parallel kinematics mechanisms. Kinematics mechanisms are used in mechanical engineering applications for machining, robotics, positioning devices, coordinate measuring, fixtures and so on. In general, mechanisms can typically be classified as either serial or parallel. Serial kinematics mechanisms are widely used and presently dominate the market.

A serial kinematics mechanism has a series of cantilever beams that are movably connected together in an end-to-end fashion by prismatic, revolute or spherical joints, forming an open loop. The closer that a member is to a base of the mechanism within the serial structure, the higher the load on that member. Additionally, the farther that a member is from the base, the higher its deflection with respect to the base member. When a serial kinematics mechanism is subjected to loading, the position of the farthest member, i.e., the end-effector, is subject to the cumulative deflections of all serial members. Unfortunately, this results in large positioning errors at the end-effector. Being constructed of cantilevers, a serial mechanism has a poor stiffness to mass ratio, making such structures bulky in design.

Serial kinematics mechanisms allow fast and easy computation of the position of the end-effector given the position or state of all actuators. In general, this computation is known as the forward kinematics of a mechanism. However, determining the position or state of all actuators given the position of the end-effector, also known as the inverse kinematics, is very difficult.

Relative to serial kinematics mechanisms, parallel kinematics mechanisms typically have an improved stiffness-to-mass ratio and better accuracy. A parallel kinematics mechanism has a plurality of links which form one or more closed loops, the links thereby sharing the load on the end-effector. Moreover, positioning errors of actuators are divided, thereby resulting in a high accuracy of the end-effector. A well-known parallel kinematics mechanism is the Stewart Platform which was introduced in 1965 and has since been the subject of extensive study and analysis. A Stewart Platform mechanism generally includes a movable platform which is connected to a base by six controllable links. For example, U.S. Pat. No. 5,656,905 discloses a general overview on mechanisms that are based on or derived from the Stewart Platform.

While parallel kinematics mechanisms can provide improved accuracy, stiffness, and high load carrying capacity, parallel mechanisms also suffer from significant control drawbacks. Most known parallel kinematics mechanisms have very difficult forward kinematics. The solutions of the forward kinematics are in the form of high-order polynomial equations, which do not allow closed-form solutions to compute the end-effector position. Computationally intensive methods such as numerical approximations must be applied in order to calculate multiple solutions and select the right one. In some cases, particularly in lower degree of freedom mechanisms, closed-form solutions may exist. However, these solutions involve algebraically complex expressions with fractional powers. Moreover, many of the aforementioned parallel kinematics mechanisms require run-time collision detection between their parallel members, further complicating the control calculations.

It has been shown that the general form of the Stewart Platform has forty feasible solutions. For some special forms of the Stewart Platform, closed-form solutions of forward kinematics exist. In these special forms, pairs of spherical joints that connect the links to base and platform are concentric. However, the difficulty of manufacturing such joints is well recognized in the art.

Some efforts have been made by designing ball and socket joints, which allow two or more links to be connected to the platform or base with independent spherical motion about a common point. However, these joints significantly restrict the range of spherical motion of the attached links and have a limited load carrying capacity. Moreover, fabrication of such a joint is very expensive and difficult.

Parallel kinematics mechanisms are increasingly used in machining and robotics. Several mechanisms for free-form milling have been introduced into the market recently. Most of the known mechanisms are based on the Stewart Platform and allow all six degrees of freedom. These known Stewart Platform mechanisms have limited the translational and rotational motion of the end-effector. However, many applications such as machining or assembly operations require actuation about one rotational axis with infinite or very high freedom, which is usually accomplished by motors or spindles mounted on the end-effector. This means that one of the actuations of these mechanisms is redundant. Because of their particular configuration, many of the aforementioned parallel kinematics mechanisms require run-time collision detection between their parallel members. Further, most known parallel kinematics mechanisms have complex polyhedral workspaces whereas engineering applications generally require cuboidal workspace shapes. This leads to a poor workspace utilization ratio for many parallel kinematics mechanisms.

A need therefore exists to provide a parallel kinematics mechanism that has simple and practical forward kinematics solutions by allowing the solution for the end-effector position in closed-form. A need exists for such a mechanism that has a robust and modular design with no redundant actuators and joints.

Moreover, a need exists to provide a rigid and accurate mechanism with large translational and rotational motion range in a cuboidal workspace. Ideally, stiffness and accuracy properties throughout the workspace of the mechanism should remain constant. The configuration of the mechanism should inherently prevent collision between its parallel members.

The present invention also relates to mechanical joints, and more particularly, to spherical joints used to allow spherical motion to three or mote limbs about a common point.

A variety of mechanical joints are known which allow spherical motion for multiple limbs about a common point. Some such joints are constructed by three hemispherical shells concentrically mounted on a ball, representing an extension of a ball and socket joint. Such a joint is disclosed, for example, in U.S. Pat. No. 5,179,525. The shortcoming of this type of joint is that the spherical motion of each limb becomes increasingly limited the greater the number of limbs connected to the ball. The joint does not allow tensile loads or high forces in general and suffers from poor rigidity and accuracy. Control of structures having such a joint, becomes difficult due to the non-linear nature of the high frictional forces produced by the preloaded ball and socket assemblies. Moreover, it is not possible to access the center of the joint without restricting spherical motion of the limbs. Neither can the joint be stacked to increase the number of interconnected limbs while maintaining concentricity.

Another joint has been made using extra yokes on a universal joint assembly, as disclosed, for example, in U.S. Pat. No. 5,797,191 and E. Fichter, *A Stewart Platform-Based Manipulator: General Theory and Practical Construction*, 1986, The International Journal on Robotics Research, Vol. 5, pp. 157–182. The mechanism allows only limited spherical motion and involves redundant revolute joints. Due to its asymmetric design, the joint suffers singularities in certain configurations. Furthermore, it cannot be stacked to increase the number of interconnected limbs and does not allow access to the center of the joint.

Another known joint as disclosed in U.S. Pat. No. 5,657,584, uses a large number of elements and pins to produce spherical motion of the attached limbs. Although this type of joint can be stacked to increase the number of interconnected limbs and allows access to the center point, it requires multiple expensive revolute joints and a complex structure. Consequently, such joint is not capable of carrying high loads and offers only limited spherical motion to its limbs.

In some joints, the limbs are not truly independent to rotate about each other, as it should ideally be for a concentric spherical joint. They are constrained with spatial relationships. For example, the members must move on a conical surface.

In other joints, the centers of rotation of the attached limbs are not coincident. This may cause at least two problems. Firstly, compressive and tensile loads in the limbs cause twisting and bending moments on the joint, and the loads are not transmitted to the other limbs as in an ideal truss. Secondly, in a controlled truss structure such as parallel kinematics machines, this kind of joint results in difficult forward kinematics that allow no closed-form solution of the end-effector position in general.

A need therefore exists for a joint structure that has improved spherical motion about a point common to its interconnected limbs than previously known joints. The joint should allow any configuration of its limbs with none of the limbs hindering the motion of any other.

SUMMARY OF THE INVENTION

The present invention provides a parallel kinematics mechanism which overcomes difficulties incurred in prior art devices. The invention further includes an improved joint structure which facilitates the construction of such an improved kinematics mechanism by allowing three or more axes to intersect at a point, regardless of their orientation.

An object of the invention is to provide an improved mechanism for positioning and orienting a member in space. A more specific object of the invention is to provide such a mechanism which facilitates simplified forward kinematics calculation with a closed-form solution. Yet another object is to provide such a mechanism with improved structural rigidity.

Advantageously, a kinematics mechanism having a design according to the present invention is such that the forward kinematics math is greatly simplified. The design of the proposed mechanism reduces calculations to the simple problem of finding the point of intersection of three spheres, which makes the forward kinematics trivial and has a closed-form solution for the end-effector position. The closed-form solution only involves simple algebraic expressions. According to an embodiment of the invention, the solution simplification has been achieved by a new concentric spherical joint that allows three or more limbs to be connected together with their longitudinal axes always intersecting at a point, regardless of the orientations.

In an embodiment, the invention utilizes a concentric spherical joint such that the structure of the positioning mechanism resembles a bi-tetrahedral configuration, giving it truss-like behavior. The bi-tetrahedral arrangement also causes decoupling between the position and orientation of the final member. Loads on the end-effector are generally distributed among all actuators which, in return, compensate for positioning errors of the end-effector through their parallel arrangement. Thereby, the mechanism provides high stiffness and accuracy. Due to the bi-tetrahedral configuration, no collision detection between parallel members is required.

Another advantage of the configuration is the high workspace volume the end-effector can reach, combined with a high dexterity throughout this workspace which is nearly cubical in shape. Furthermore, the positioning mechanism is able to operate at high speeds due to its parallel design and simple closed-form solution.

Work tools such as cutting tools or robot grippers can be mounted on the end-effector. In an embodiment, the work tool is powered by an actuator or a motor that is fixed on the base and transmits its rotation on the work tool through a telescopic spline-shaft assembly. This allows moments acting about the longitudinal axis of the working member to be directly transferred to the base, relieving the overall structure of the positioning mechanism. In another embodiment, the work tool is powered by an actuator or a motor that is fixed on the end component.

Another advantage of the invention is that, in an embodiment, it provides a mechanism that fixedly has a modular design that only uses five identical actuator assemblies, two kinds of concentric spherical joints, a base, a motor, and a working member. The low number of parts and the usage of mostly revolute joints results in a precise and cost-efficient positioning mechanism that finds wide use in many areas.

Mechanisms according to an embodiment of the invention may be useful in machining and robotics. In particular, the mechanism can be used for free-form milling, assembly operations, and coordinate measuring or any other kind of operation that requires a member to be positioned and oriented in space.

In an embodiment, another object of the invention is to provide a concentric spherical joint that allows three or more limbs to be connected together with their longitudinal axes always intersecting at a point, regardless of their orientation. This joint provides advantages over the prior art, exhibiting an improved range of spherical motion among its joined limbs, few parts, low wear and friction, improved rigidity, and improved accuracy. It also can sustain tensile loads, unlike some ball-and-socket joints. The proposed concentric spherical joint according to an embodiment of the invention advantageously has a simple and robust design, involving only a minimum number of required revolute joints, providing total spherical motion to three interconnected limbs.

A structure can be assembled using several concentric spherical joints according to an embodiment of the invention to increase the number of limbs to any number with their longitudinal axes intersecting at a common point. While combinations of known joints constrain the spherical motion range, the concentric spherical joint according to an embodiment of the invention enhances this range.

The concentric spherical joint according to an embodiment of the invention has many applications in a wide range of engineering disciplines. It may be used in civil engineering for spatial trusses, space grid structures, and geodesics. When used as a joint in a parallel kinematics mechanism, the concentric spherical joint can extremely simplify the forward kinematics and reduce the amount of necessary computations, allowing a parallel kinematics mechanism to operate at significantly higher speeds.

Additional features and advantages of the present invention are described in, and will be apparent from, the detailed description of the preferred embodiments and from the drawings.

BRIEF DESCRIPTION OF THE DRAWINGS

The following is a description, by way of example only, of different embodiments of the mechanism, its variations, derivations and reductions.

FIG. 1 is a perspective view of a bi-tetrahedral parallel kinematics mechanism having five prismatic actuators and first and second concentric spherical joint assemblies that are linked by a rigid intermediate limb. The embodiment includes one revolute actuator which is mounted to a fixed base with a telescopic spline shaft assembly for rotationally driving an end-effector or work tool with six degrees of freedom.

FIG. 2 is a perspective view of another bi-tetrahedral parallel kinematics mechanism having a revolute actuator mounted to the second concentric spherical joint assembly for rotationally driving an end-effector or work tool with six degrees of freedom.

FIG. 3 is a perspective view of a bi-tetrahedral parallel kinematics mechanism with a prismatic actuator linked as an intermediate limb between the first and second concentric spherical joint assemblies for moving a work tool with six degrees of freedom.

FIG. 4 is a perspective view of a bi-tetrahedral parallel kinematics mechanism with a rigid intermediate limb linking the first and second concentric spherical joint assemblies for moving a work tool with five degrees of freedom.

FIG. 5 is a perspective view of a bi-tetrahedral parallel kinematics mechanism having a revolute actuator as an intermediate limb linking the first and second joint assemblies for rotating the end-effector with six degrees of freedom.

FIG. 6 is a perspective view of a bi-tetrahedral parallel kinematics mechanism having a revolute actuator mounted to the base, a spline shaft assembly driven by the revolute actuator, a first concentric spherical joint assembly having a revolute joint therein for transmitting rotational motion from the spline shaft assembly through a rotatable shaft as an intermediate limb linking the first and second concentric spherical joint assemblies for moving the end-effector with six degrees of freedom.

FIG. 7 is a perspective view of a four degree of freedom tetrahedral mechanism which includes three piston-cylinder prismatic actuator limbs, a concentric spherical joint assembly, and one revolute actuator mounted to movable joint assembly for driving the end-effector or work tool.

FIG. 8 is a perspective view of a four degree of freedom tetrahedral mechanism with a revolute actuator fixedly mounted to the base for driving the end-effector via a telescopic spline shaft assembly.

FIG. 9 is a perspective view of a four degree of freedom mechanism having three alternative slide-and-track type prismatic actuator limbs and a revolute actuator mounted to the movable joint assembly for driving the end-effector.

FIG. 10 is a perspective view of a four degree of freedom mechanism having three alternative elbow-linkage revolute actuator limbs and a revolute actuator mounted to the movable joint assembly for driving the working member.

DETAILED DESCRIPTION OF THE PRESENTLY PREFERRED EMBODIMENTS

Figure 1:
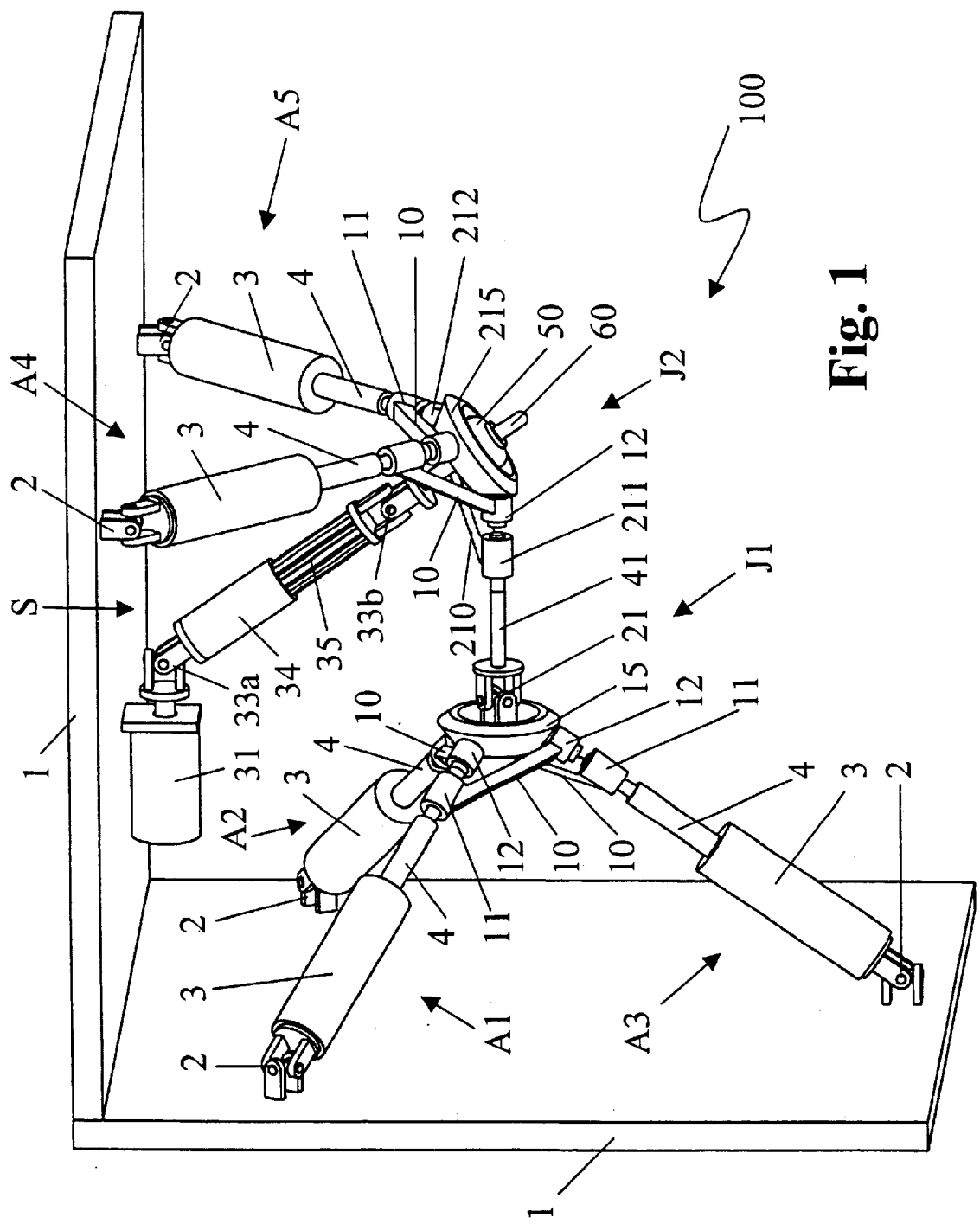
FIGS. 1–6 illustrate various embodiments of five and six-axis, bi-tetrahedral mechanisms constructed in accordance with teachings of the invention.

Now referring to the drawings, wherein like numerals designate like components, FIG. 1 shows a five-axis parallel kinematics mechanism 100 constructed in accordance with teachings of the present invention. Mechanism 100 includes a fixed base 1 and is operable to move and position an end component 50 in space relative to the base 1 with five degrees of freedom. In an embodiment, an end-effector or work tool 60 mounted to the end component 50 can be moved and positioned in space relative to the base 1 with six degrees of freedom. The position and orientation of the end component 50 are determined by five actuators A1, A2, A3, A4, and A5, as will be described.

Figure 19:
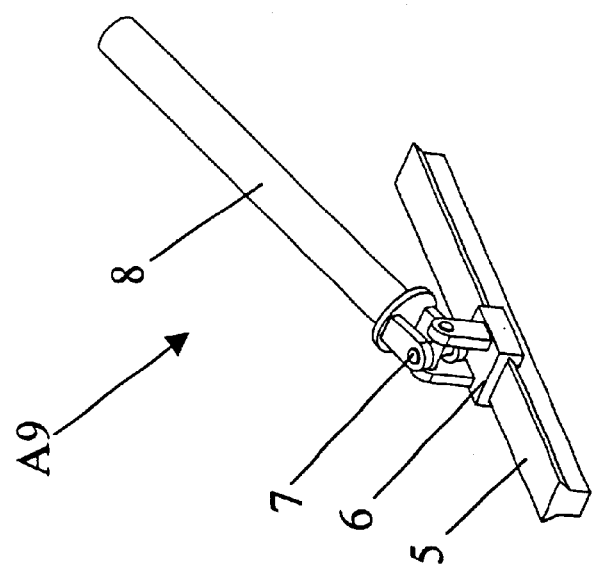
FIG. 19 is a perspective view of an alternative actuator limb embodiment having a slide-and-track type prismatic structure.

As illustrated in FIG. 1, mechanism 100 includes a first tetrahedral structure formed by first, second, and third actuator limbs A1, A2, A3 each of which is mounted to the base 1 by a respective universal joint 2. Specifically, in the embodiment illustrated, each of actuator limbs is a prismatic device, having a respective first limb member 3, second limb member 4, and an elbow 10. Upon actuation of a respective actuator limb, the first limb member 3 and second limb member 4 move relative to each other for selectively extending or retracting the actuator limb along an axis. The first limb member 3 is pivotably connected relative to the base 1 by the respective universal joint 2. As illustrated, the actuator limbs A1–A5 are a telescopic piston-cylinder device, the first limb member 3 being a hydraulic cylinder and the second limb member 4 being a piston. It should be understood that the actuator limbs could also be some other type of actuator device, such as a sliding-track mechanism (e.g., FIG. 19), an elbow mechanism (e.g., FIG. 20), or a piston-cylinder device mounted on a ball-and-socket joint (e.g., FIG. 21). Further, the prismatic actuation achieved by the piston cylinder arrangement could be substituted by alternative arrangements such as a linear motor, a ball screw-nut mechanism, a rack and pinion mechanism, or any other kind of a linear actuator.

Figure 21:
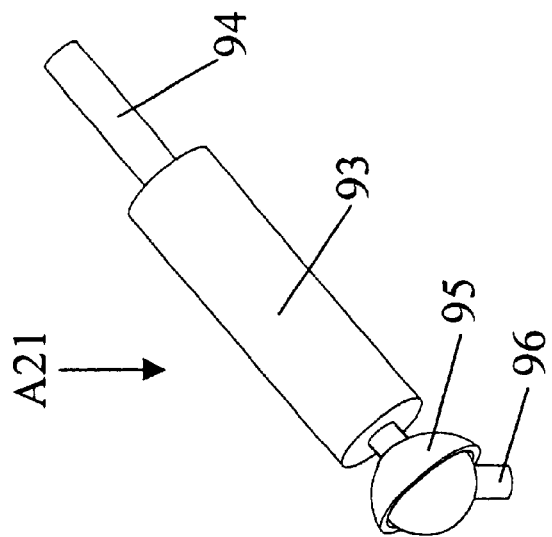
FIG. 21 is a perspective view of an alternative actuator limb embodiment having a ball-and-socket structure.

The respective second limb members of actuator limbs A1, A2, A3 are pivotably connected to the elbows by means of revolute joints 11 allowing the elbows one rotational degree of freedom with respect to the second limb members about a limb axis. It should be understood that the revolute joint 11 between elbow 10 and second limb member 4 could be replaced by a revolute joint between first limb member 3 and universal joint 2, allowing same rotational and translational freedom of elbow 10 with respect to the base (this alternative location of revolute joint 11 is not shown). Further, in such a case same said revolute joint and universal joint 2 could be replaced by a ball and socket joint (FIG. 21).

The respective elbows 10 of actuator limbs A1, A2, A3 are mounted to a first joint body 15 such that the elbows 10 and the first joint body together make up a first concentric spherical joint assembly J1, as shown by way of example in FIG. 1. Each of the second limb members 4 has two non-actuated rotational and one actuated translational degree of freedom whereas each of the elbows has three non-actuated rotational and one actuated translational degree of freedom relative to base 1.

Figure 14:
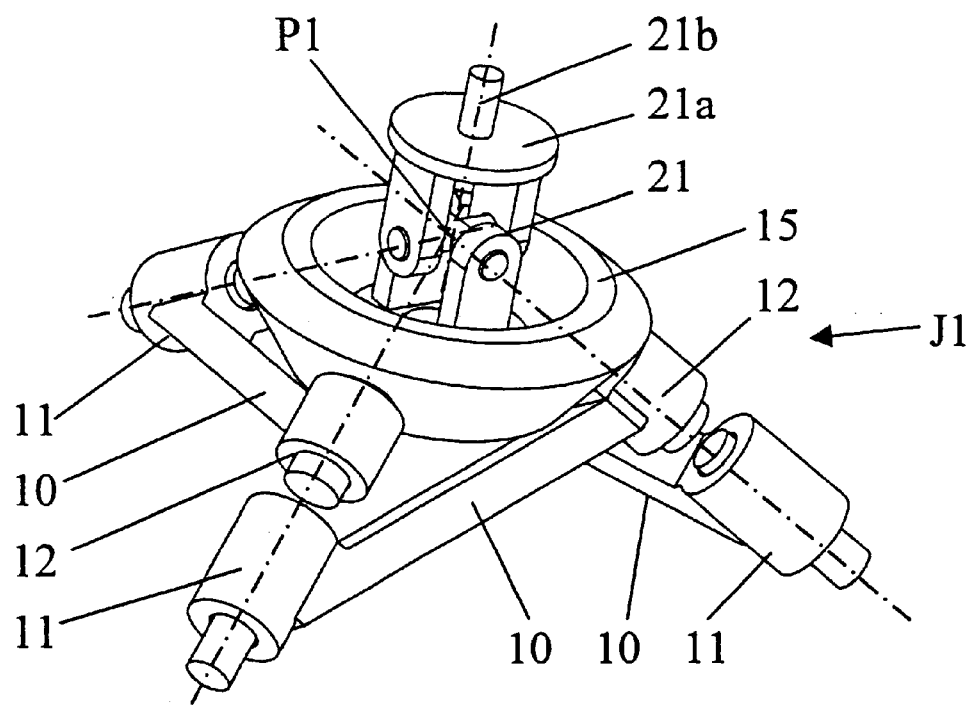
FIG. 14 is a perspective view of another embodiment of a concentric spherical joint constructed in accordance with teachings of the invention, and as used in the mechanism of FIG. 1, the joint assembly having three elbows and further having a universal joint connector mounted to the joint body, the center of the universal joint being coincident with the point of intersection of the axes of all proximal and distal revolute joints.

Referring also to FIG. 14, the first assembly J1 is shown in greater detail. The first joint assembly J1 connects together three limbs A1, A2, A3 of the mechanism 100 with a geometry that eventually facilitates a closed-form solution for the forward kinematics. The joint assembly J1 includes a central joint body 15. In the illustrated embodiment, the joint body 15 is generally annular and frustoconical in shape. The joint assembly J1 also includes three pivotable elbows 10 mounted to the body 15 with respective proximal revolute joints 12. A distal revolute joint 11 is also provided at an opposite end of each elbow 10, by which elbow 10 is mounted to the second limb member 4 of a respective one of the actuator limbs A1, A2, A3.

According to an embodiment of the invention, the axes of all six revolute joint 11 12 in the first concentric spherical joint assembly J1 intersect at a point P1, as shown in FIG. 14. This configuration allows the second limb members of the limbs A1, A2, and A3 to rotate about any axis passing through the point P1 independently of each other. The first joint body 15 has three degrees of freedom with respect to the base 1. The position of the joint body 15 is defined by the state of the three actuator assemblies A1, A2, A3.

As shown in FIG. 1, the mechanism 100 also includes a second tetrahedral structure formed by fourth and fifth actuator limbs A4, A5, a second concentric spherical joint assembly J2 with a second joint body 215, and an intermediate limb mounted to link the first joint body 15 and the second joint body 215 of the respective joint assemblies J1 and J2 . Thus, the mechanism 100 is generally of a bi-tetrahedral structure.

Similarly to the first, second, and third actuator limbs A1, A2, and A3, the fourth and fifth actuator limbs A4, A5 each has a first limb member 3 connected to the base 1 by a universal joint 2, an extendible second limb member 4 as well as a pivotably mounted elbow 10.

The elbows 10 of the two actuator limbs A4, A5 are mounted to a second joint body 215 such that the elbows 10, 210, and the second joint body together make up a second joint assembly or second concentric spherical joint assembly J2. Still referring to FIG. 1, the kinematics mechanism 100 includes an intermediate limb 41 which links the first joint body 15 and the second joint body 215 of the respective joint assemblies 11 and J2. The intermediate limb 41 is connected to the first joint body 15 by a universal joint 21, which has its center of rotation at point P1 (FIG. 14). The intermediate limb 41 is connected to the second concentric spherical joint assembly J2 by a revolute joint 211 allowing rotation about the longitudinal axis of the rigid member 41.

Figure 15:
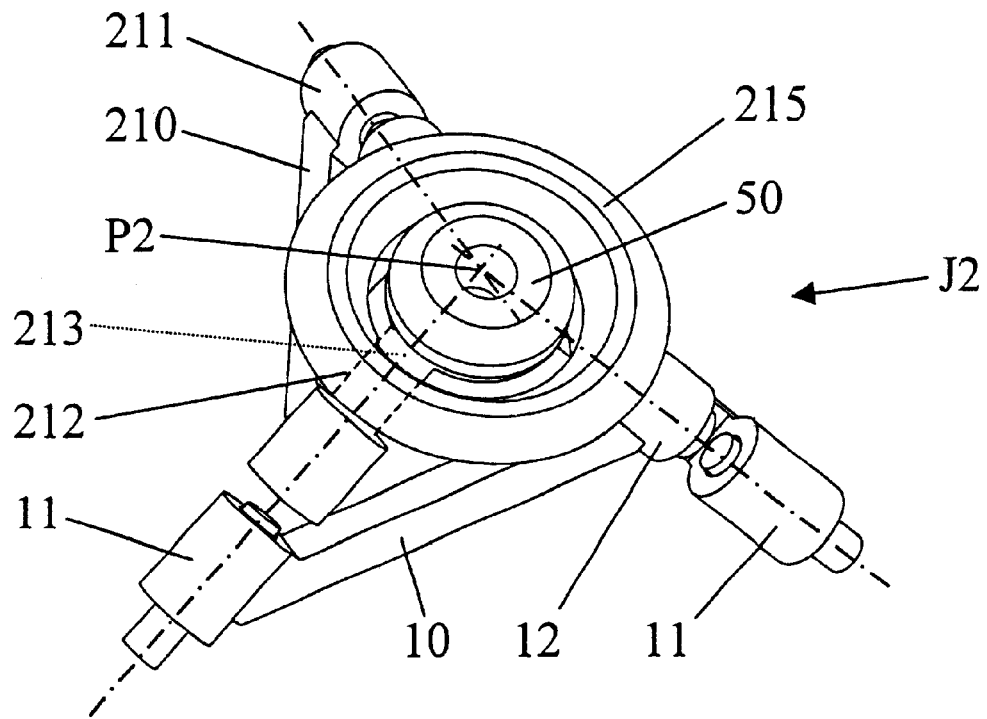
FIG. 15 is a perspective view of another embodiment of a concentric spherical joint assembly constructed in accordance with teachings of the invention, and as used in the mechanism of FIG. 1, the joint assembly including three elbows, one of the elbows being rigidly connected to a central end component via a rigid component extending through the joint body.

Referring to FIG. 15, the second joint assembly J2 is shown in greater detail. Like the first joint assembly J3, the illustrated embodiment of the joint assembly J2 has a joint body 215 and three elbows, including two elbows 10, as described above in connection with joint assembly J1, and one elbow 210. Elbows 10 are rotatably mounted to the joint body 215 with respective proximal revolute joints 12, and the elbow 210 is rotatably mounted to the joint body 215 with a proximal revolute joint 212. Elbows 10 have a distal revolute joint 11 for further connecting to members or limbs. Elbow 210 also has a distal revolute joint 211 by which the elbow can be mounted to the intermediate limb 41, as illustrated in FIG. 1. The axes of all six revolute joints 11, 211, 12, and 212 in the concentric spherical joint assembly J2 intersect at a point P2 allowing the actuator limbs and the intermediate limb 41 to rotate about any axis passing through the point P2 independently of each other.

As shown in FIG. 15, the elbow 210 is rigidly connected to the end component 50, which movably resides within a central opening of the second joint body 215. more specifically, a portion 213 of the elbow 210 extends through the revolute joint 212 into the joint body 215 and is rigidly connected to end component 50. In this configuration, the second joint body 215 has four degrees of freedom with respect to the base 1, and the end component 50 has five degrees of freedom with respect to the base 1. The position of the end component 50 is defined by the state of all five actuator assemblies A1, A2, A3, A4, and A5.

The end component 50 always maintains the same orientation relative to a limb (e.g. the intermediate limb 41 in FIG. 1) which is connected to elbow 210 by distal revolute joint 211, except for the rotational orientation about the distal revolute. joint 211. The usefulness of this embodiment is that the limb which is attached to the elbow 210 can control two orientations of end component 50. In contrast, limbs (e.g. the second members 4 of actuator limbs A4, A5 in FIG. 1) connected to the other two elbows 10 are each only capable of controlling one orientation of the end component 50.

It should be understood that the universal joint 21 and the distal revolute joint 211 could be substituted by a ball-and-socket joint connecting the intermediate limb 41 to joint body 15. In such a case, the intermediate limb would be rigidly mounted to the elbow 210.

Referring back to FIG. 1, the end component 50 can support an end-effector or work tool 60, such as a gripper, a welding device, a drill or milling device, a cutting tool, a press element, a sensor or any other kind of end-effector. Additionally, such a work tool 60 could be mounted to the end component 50 by a further revolute joint, thereby allowing the work tool 60 six degrees of freedom. In the illustrated embodiment, work tool 60 is rotationally driven by a motor 31 mounted to the base 1, the motor 31 transmitting power through a telescopic spline shaft assembly S to the work tool 60.

As shown, the spline shaft assembly S includes two universal joints 33a, 33b connected by a sleeve 34 and a spline shaft 35 allowing torque transmission between the two non-parallel and non-intersecting axes of the motor 31 and the work tool 60. The actuator assemblies A1, A2, A3, A4, A5 form kinematic loops through the spherical joint assemblies J1 and J2 thus giving the mechanism 100 its parallel kinematic characteristics.

It should be understood that the mechanism 100, and other mechanisms described herein, may be controlled by one or more computers (not shown). The computer is operable to controllably move the mechanism, and the computer can instruct the actuator limbs to move in a desired manner. In a generally known manner, the computer receives various feedback inputs which indicate the position and status of the mechanism, such as signals transmitted from sensors located at the respective actuators. From this actuator position information, the computer can calculate the position and orientation of the end-effector, as is generally known in the art. This type of calculation is generally known as forward kinematics. The advantageous design of the concentric spherical joint disclosed herein facilitates a closed-form solution to this forward kinematics calculation, as will be recognized by those skilled in the art. This enables greatly simplified mathematics and faster processing by the computer.

Figure 2:
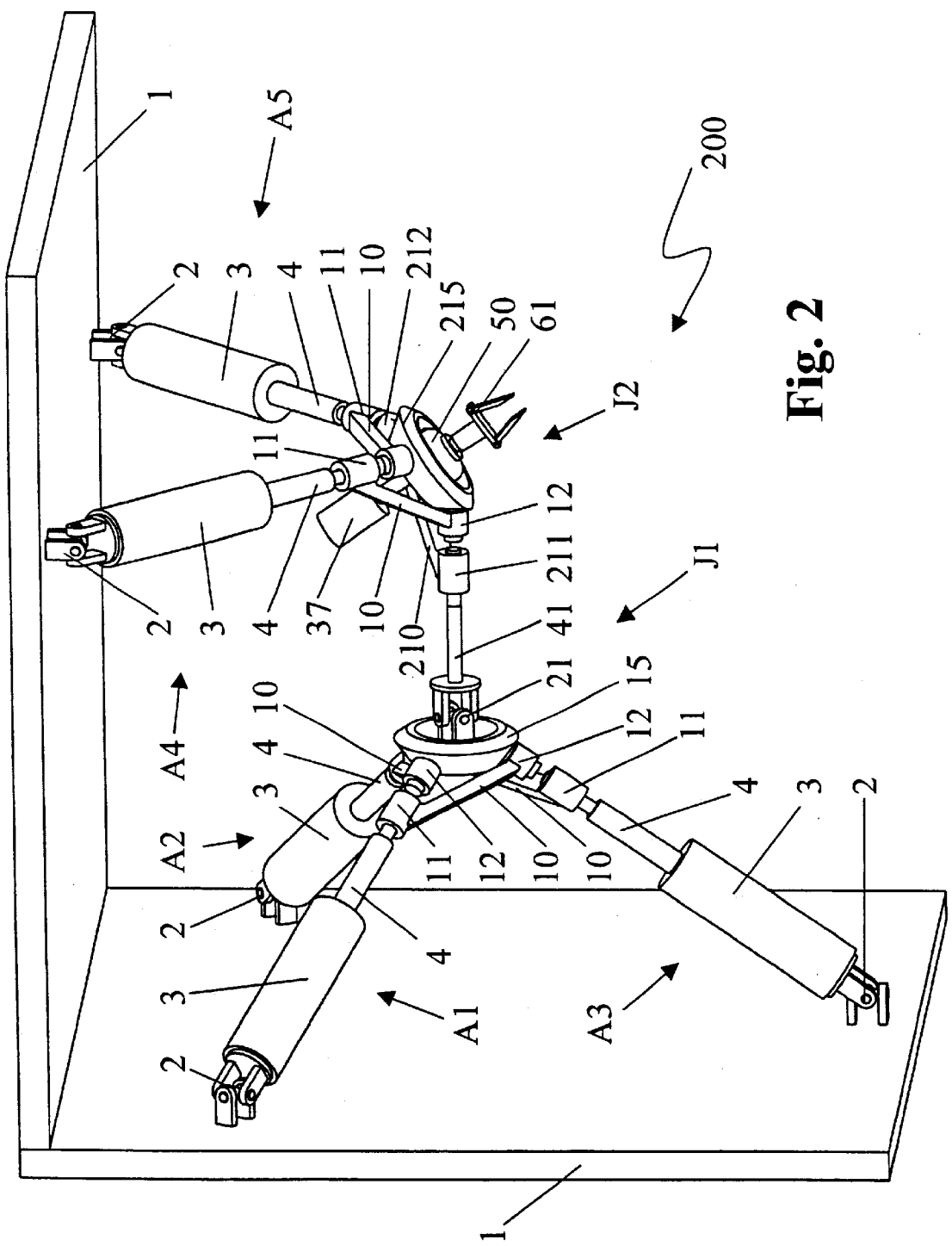

Turning to FIG. 2, another mechanism 200 is shown. The embodiment of FIG. 2 is similar to the embodiment of FIG. 1, except that mechanism 200 has a motor 37 mounted to the end component 50 of the second concentric spherical joint assembly J2 for rotating a work tool 61 rotatably mounted to the end component 50.

Figure 3:
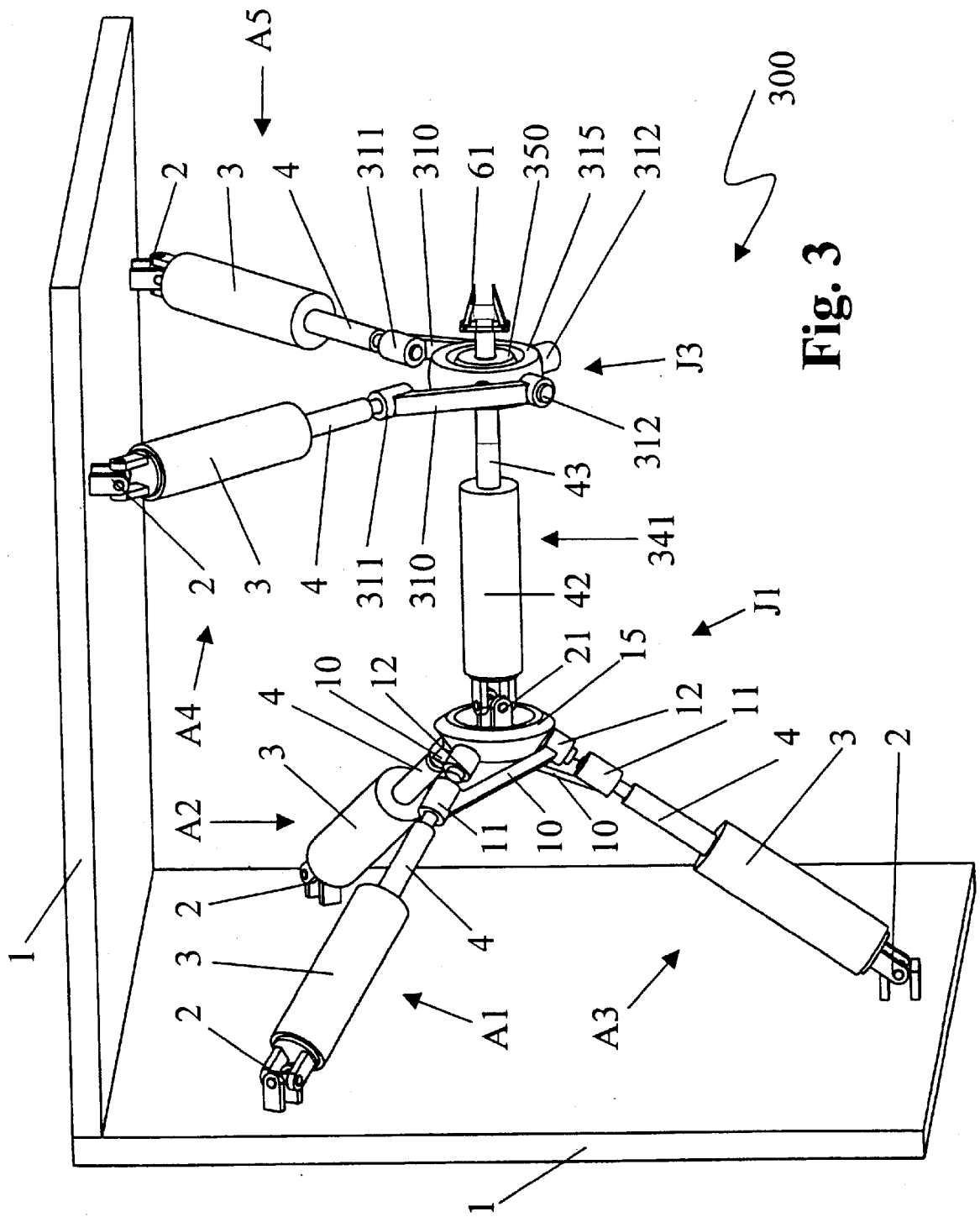

FIG. 3 illustrates a further mechanism 300 for positioning and orienting a member in space with six degrees of freedom. The mechanism 300 is similar to the embodiments of FIGS. 1 and 2, except that the mechanism 300 of FIG. 3 includes a prismatic device such as an intermediate actuator limb 341 which is mounted to link the joint body 15 of the first joint assembly J1 to a joint body 315 of a second concentric spherical joint assembly J3, instead of the rigid member 41 of FIG. 2. Moreover, the second joint assembly J3 has a different configuration than the joint assembly J2 illustrated in FIGS. 1 and 2. Joint assembly J3 is illustrated in greater detail in FIG. 16.

The intermediate actuator limb 341 includes a first member 42 which is mounted to the body 15 of the first joint assembly J1 by a universal joint 21, as illustrated in FIG. 3. The actuator limb 341 also includes a second member 43 which is mounted to an end component 350 of the concentric spherical joint J3 by means of a revolute joint 355 (FIG. 16) that permits the rotation of the second member 43 of the intermediate actuator limb 341 about a longitudinal axis of the intermediate actuator limb 341.

Figure 16:
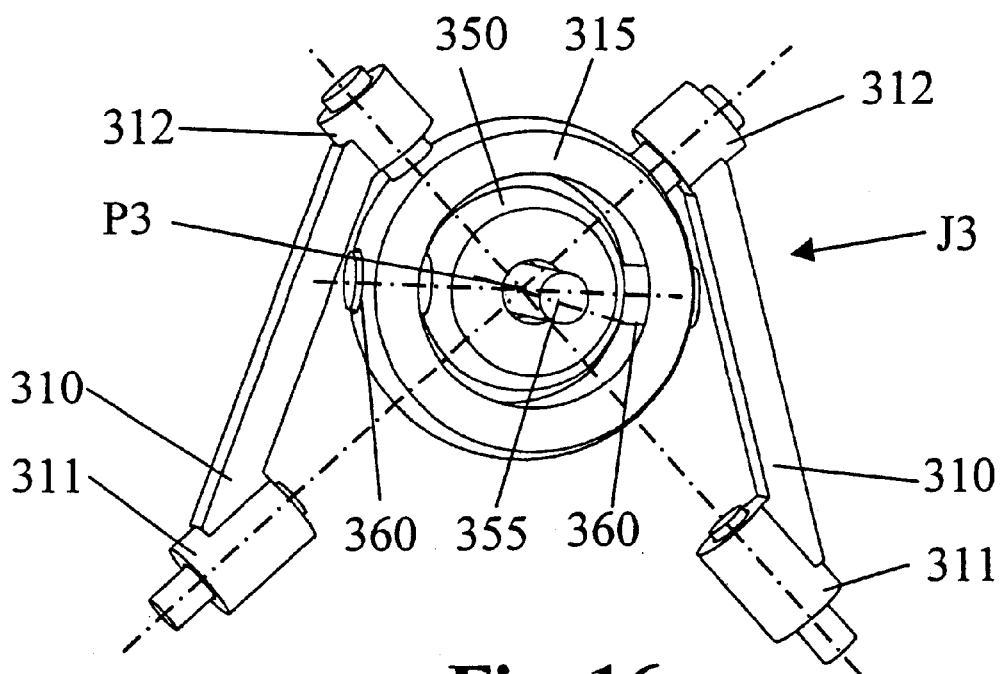
FIG. 16 is a perspective view of another embodiment of a concentric spherical joint assembly constructed in accordance with teachings of the invention, and as used in the mechanism of FIGS. 3–6, the joint assembly having two elbows and a central end component mounted to the joint body by revolute joints.

As illustrated in FIG. 16, the end component 350 is pivotally mounted centrally within an opening of the joint body 315 by a pair of revolute joints 360. The joint assembly J3 has two elbows 310, each being mounted to the joint body 315 by respective proximal revolute joints 312. The intermediate actuator limb 341 is operable to selectively move the first and the second joint bodies of respective joint assemblies J1 and J3 relative to each other. In the embodiment shown in FIG. 16, the axis of rotation of the end component 350 relative to the joint body 315 and the axes of rotation of the elbows 310 relative to the joint body 315 are non-parallel All axes of the six revolute joints 311, 312, 355, and 360 of the concentric spherical joint assembly J3 intersect at a point P3. Thus, the revolute joint 355 is analogous to the distal revolute joints 311 and the revolute joints 360 are analogous to the proximal revolute joints 312. The joint body 315 of joint assembly J3 has four degrees of freedom with respect to the base 1, whereas the end component 350 has five degrees of freedom with respect to the base 1. As illustrated in FIG. 3, a work tool 61 movably mounted to the end component 350 and rigidly connected to the second member 43 of the intermediate actuator limb 341 has six degrees of freedom.

Figure 4:
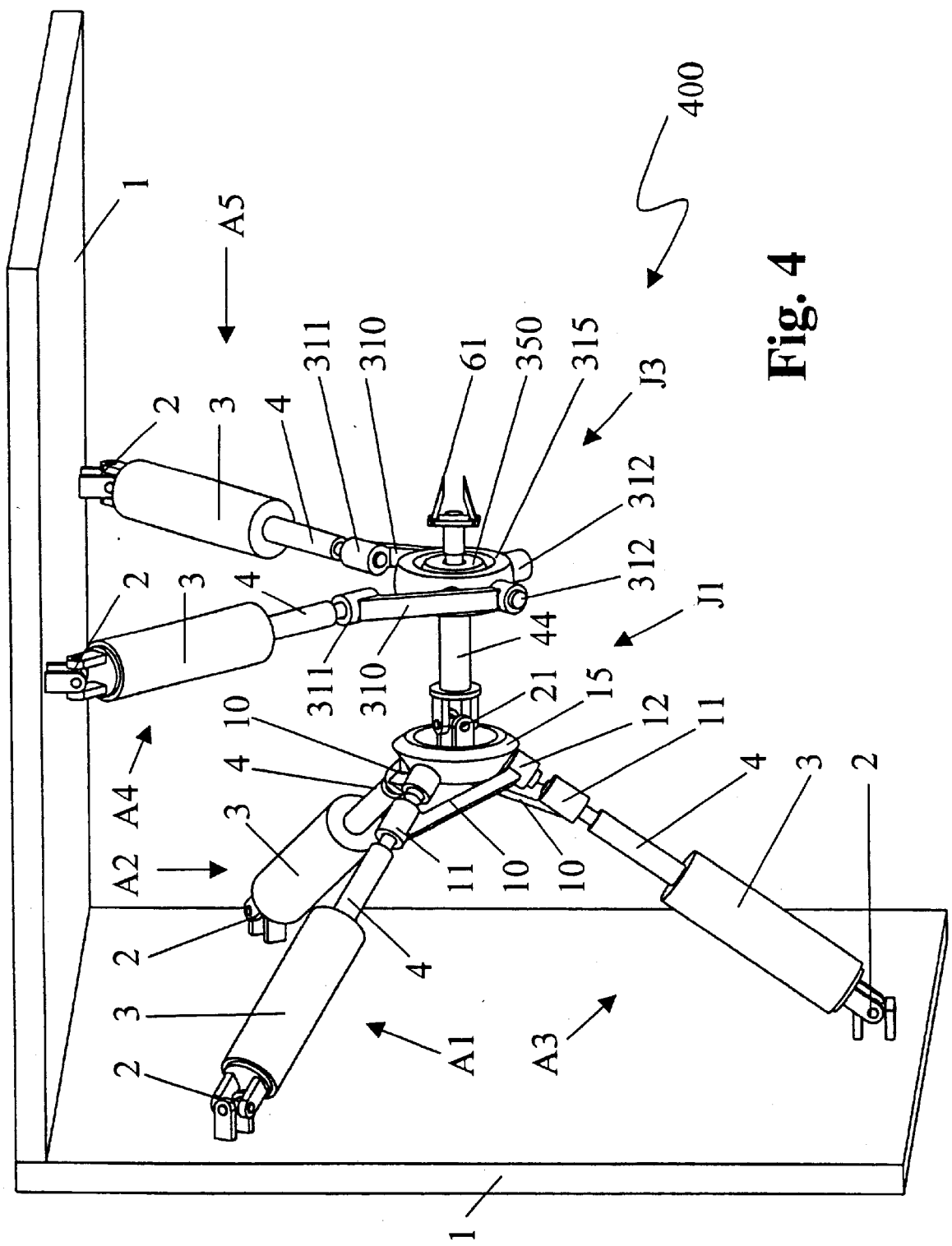

Turning now to FIG. 4, a further mechanism 400 for positioning and orienting a member in space with five degrees of freedom is shown. Mechanism 400 represents a variation of the embodiment of FIG. 3, wherein the prismatic actuator limb 341 of the embodiment of FIG. 3 has been replaced with a rigid intermediate limb 44. An end of the intermediate limb 44 is mounted to the universal joint 21 on the joint body 15 of the first concentric spherical joint assembly J1. An opposite end of the intermediate limb 44 is mounted to the revolute joint 355 (FIG. 16) on the end component 350 of the concentric spherical joint assembly J3, allowing rotation about the longitudinal axis of the revolute joint. A work tool 61 is mounted to the rigid intermediate limb 44 and has five degrees of freedom.

Figure 5:
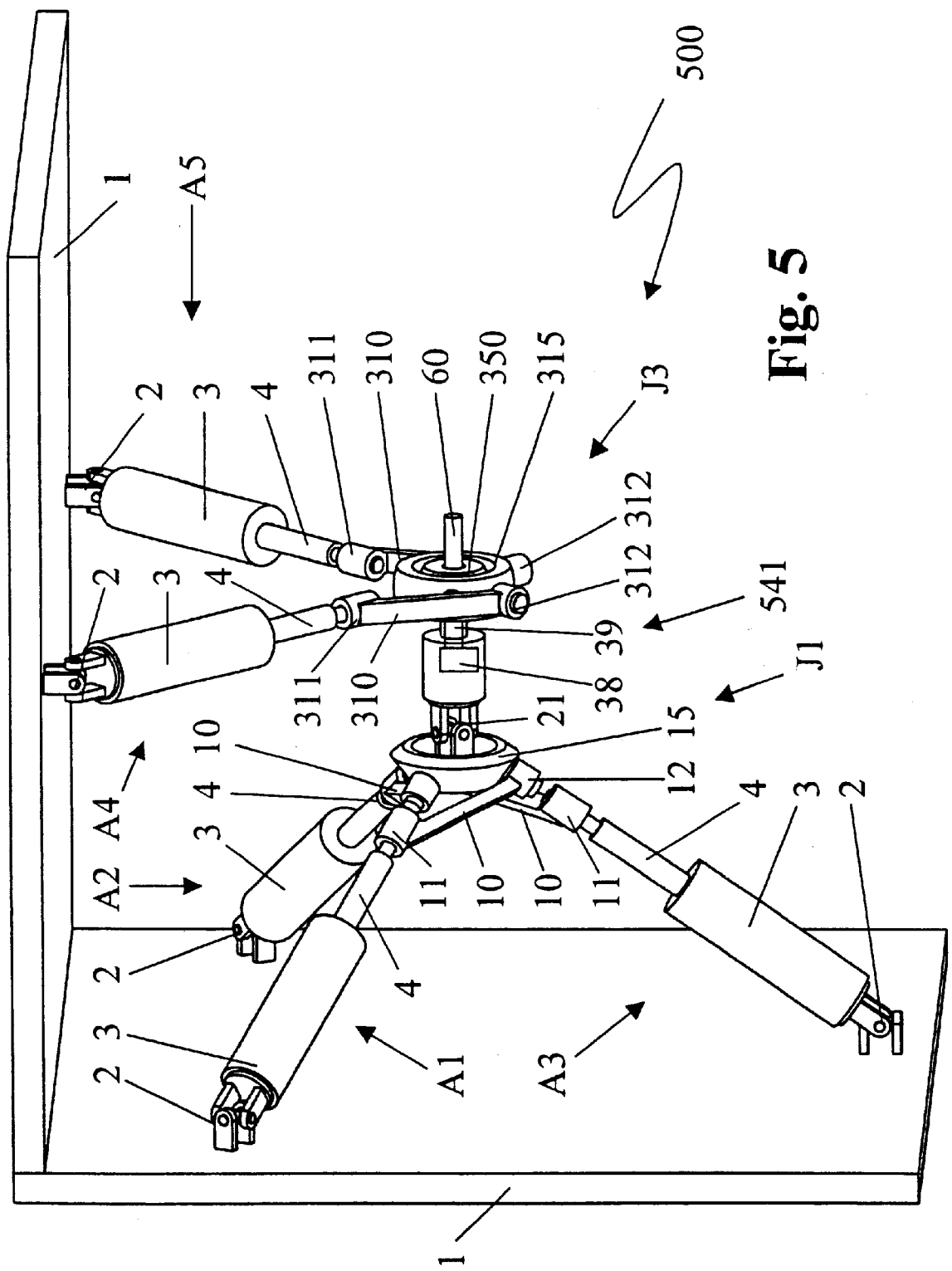

A further embodiment is illustrated in FIG. 5, showing a mechanism 500 for positioning and orienting a member in space with six degrees of freedom. Mechanism 500 is generally similar to the embodiment of FIG. 3, but has a revolute actuator 541 linking joint body 15 of the first joint assembly J1 to joint body 315 of the second joint assembly J3, instead of the prismatic actuator 341 of the mechanism 300 in FIG. 3. The revolute actuator 541 of mechanism 500 has a first member 38, illustrated as a motor, and a second member 39, illustrated as a shaft. The revolute actuator 541 is actuatable to cause rotation of the second member 39 relative to the first member 38. The first member 38 is mounted to joint body 15 of the first joint assembly J1 by the universal joint 21. The second member 39 is connected to the end component 350 of the second joint assembly J3 by means of the revolute joint 355, thereby allowing rotation about the longitudinal axis of the revolute actuator 541. A work tool 60 is driven by the rotation of member 39 and has six degrees of freedom.

Figure 6:
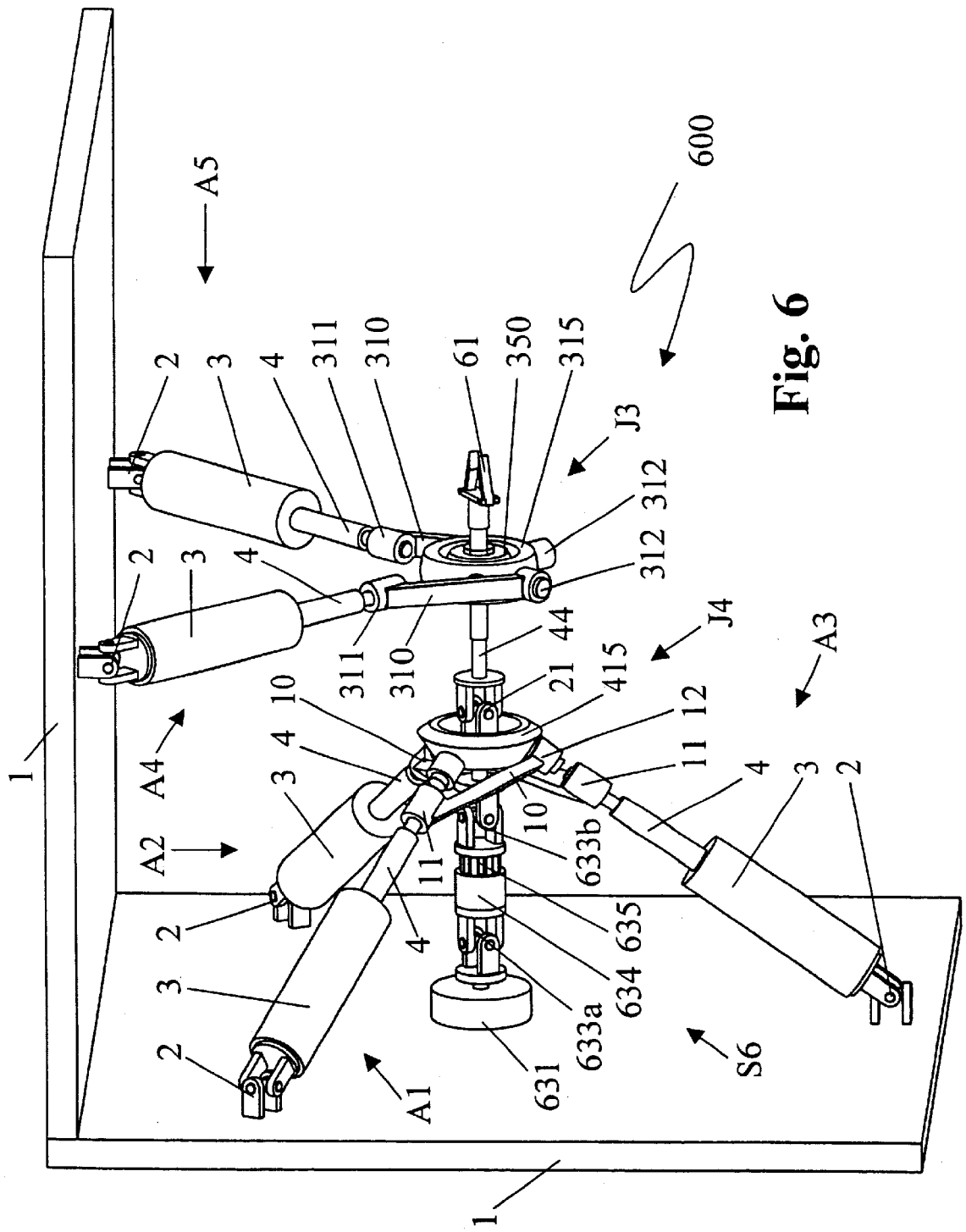

Referring to FIG. 6, an alternative mechanism 600 for positioning and orienting a member in space with six degrees of freedom is shown. The embodiment of FIG. 6 is similar to the embodiment of FIG. 5, but the mechanism 600 has a concentric spherical joint assembly or first joint assembly J4 which includes a central revolute joint 416 (FIG. 13) allowing rotation of the intermediate limb 44 about a central axis passing through the point P4 (FIG. 13), as a rotary shaft for rotating the work tool 61 mounted to the second joint assembly J3. The mechanism 600 includes a motor 631 mounted to the base 1. A spline shaft assembly S6 is connected between the motor 631 and the first joint assembly J1. Through the spline shaft assembly S6, the motor 631 transmits power to the work tool 60, passing through joint body 415. The spline shaft assembly S6 has a universal joint 633a, which drives female and male spline shaft members, 634 and 635, respectively. Another universal joint 633b connects the spline member 635 to the universal joint 21, thereby rotating the central revolute joint 416 (FIG. 13) inside joint body 415 of the joint assembly J4. The intermediate shaft 44 is then rotationally driven through the universal joint 21. The shaft 44 is mounted to rotate the work tool 61, thereby providing the work tool 61 with six degrees of freedom.

Figure 7:
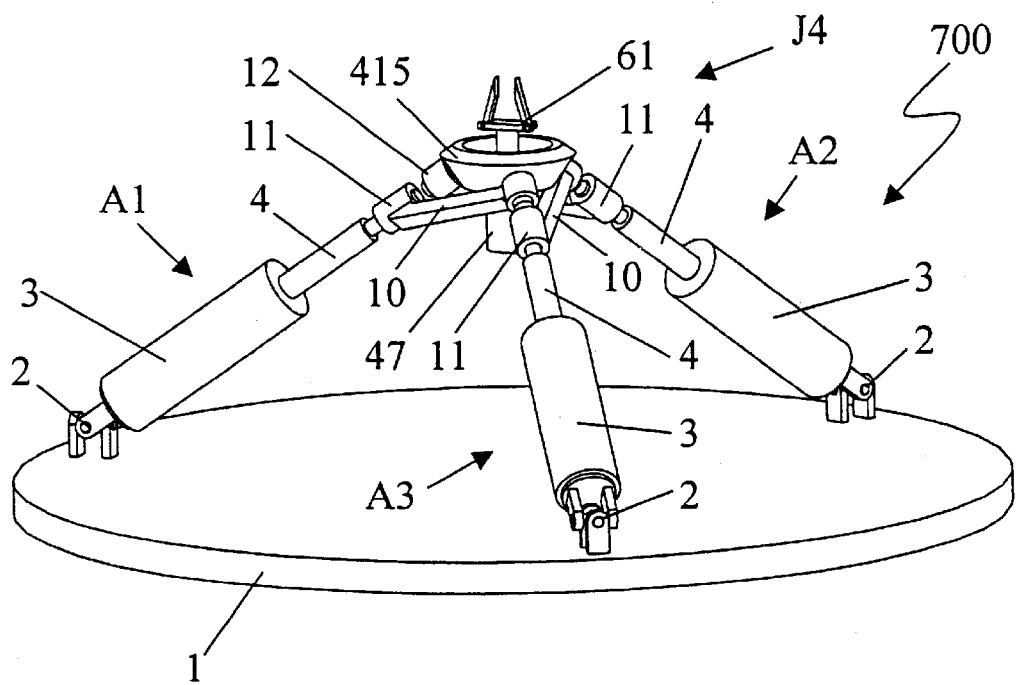
FIGS. 7–10 illustrate various four-axis, tetrahedral mechanisms constructed in accordance with teachings of the invention with a concentric spherical joint assembly for moving an end-effector.

FIGS. 7–10 illustrate various tetrahedral kinematics mechanisms for providing four degrees of freedom, useful for purposes of free form machining as well as other positioning and orienting devices requiring limited degrees of freedom. Referring to FIG. 7, a mechanism 700 is shown which has three prismatic actuator limbs A1, A2, A3 mounted to a base 1, the actuator limbs A1, A2, A3 being also mounted to a joint body 415 of a concentric spherical joint assembly J4, as described above in connection with FIGS. I and 6, forming a tetrahedral structure. Each of the limbs A1, A2, A3 is mounted to the base 1 with a universal joint 2. The mechanism 700 includes a motor 47 mounted to the body 415 of the concentric spherical joint assembly J4. The motor 47 has three degrees of freedom with respect to the base 1. The mechanism 700 also includes an end-effector or work tool 61 that is mounted to the motor 47 and can be positioned and oriented in space with four degrees of freedom. The joint assembly J4 is shown in greater detail in FIG. 13. The actuator assemblies A1, A2, A3 form kinematic loops through the concentric spherical joint assembly J4 thus making the mechanism 700 a truly parallel kinematic mechanism.

Figure 8:
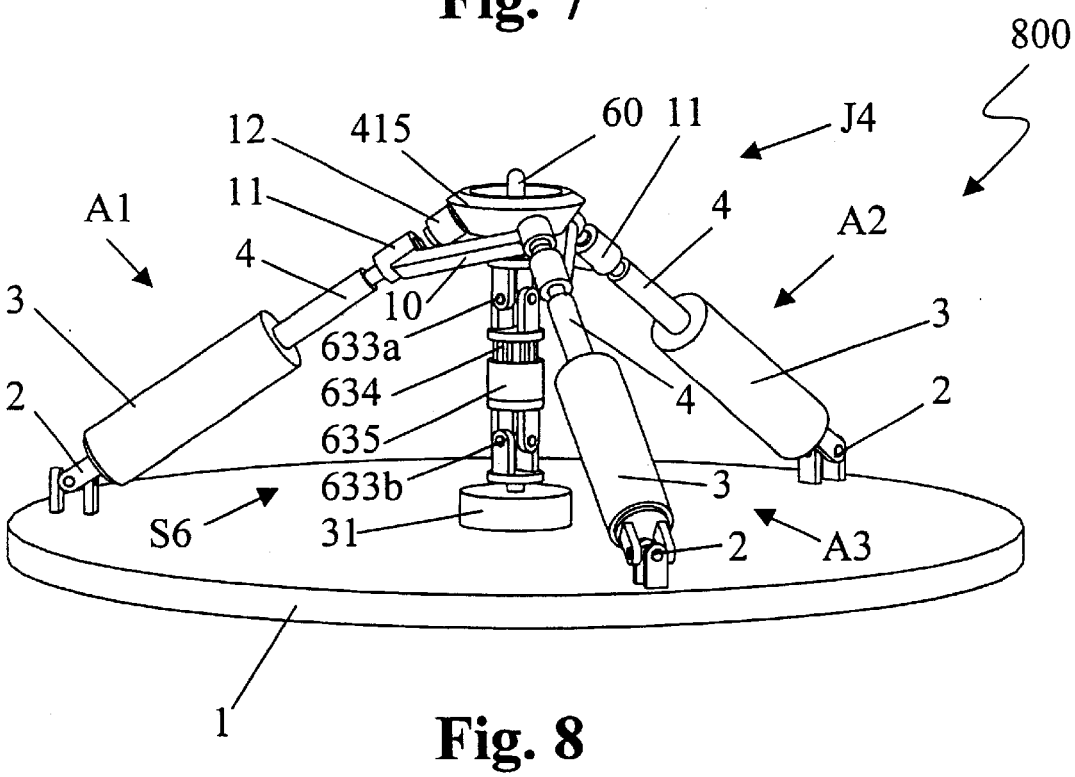

Referring to FIG. 8, an alternative mechanism for positioning and orienting a member in space with four degrees of freedom is shown. This is constructed similarly to the embodiment of FIG. 7, but, as in the embodiment described in connection with FIG. 6, a motor 31 and a spline shaft assembly S6 may be provided to rotate the work tool 60 of mechanism 800. The body 415 of the joint assembly J4 includes a revolute joint 416 (FIG. 13) which connects between the work tool 60,and the spline shaft assembly S6 to allow rotation. The spline shaft assembly S6 includes two universal joints 633a and 633b connected by a sleeve 634 and a spline shaft 635, allowing transmission of rotational motion between the two non-parallel and non-intersecting axes of the motor 31 and the work tool 60. The joint body 415 has three degrees of freedom with respect to the base 1 whereas the work tool 60 has four degrees of freedom with respect to the base 1.

Figure 9:
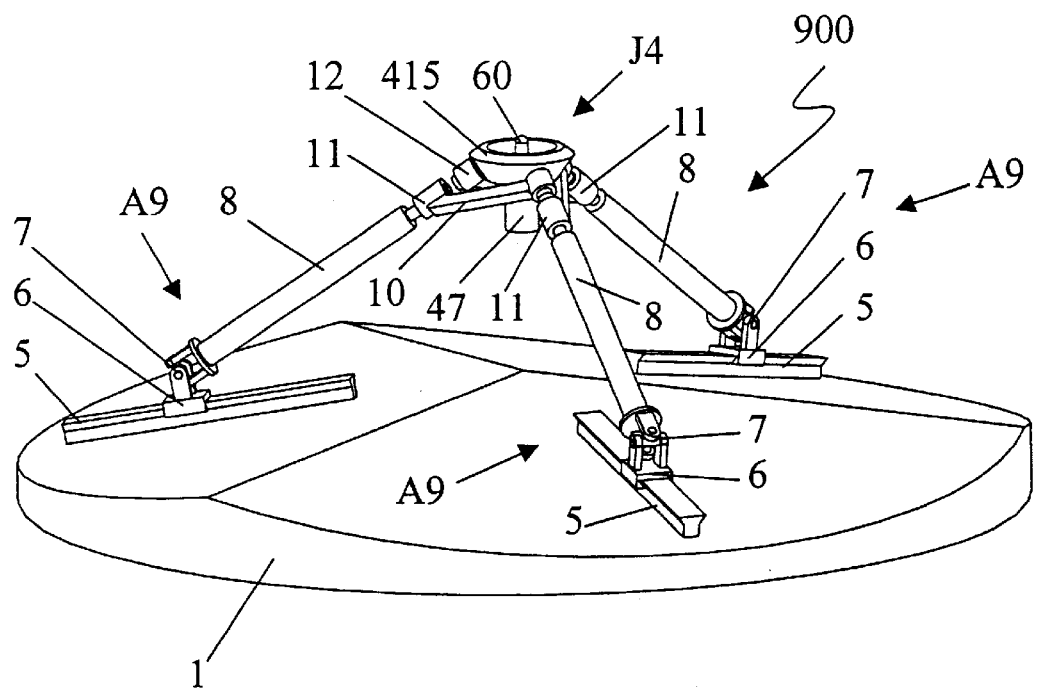

Illustrating the implementation of alternative types of actuator limbs, the embodiment of FIG. 9 illustrates a mechanism 900 having a base 1 and end-effector or work tool 60 which can be positioned and oriented in space with four degrees of freedom. The embodiment of FIG. 9 includes three actuator limbs A9 of a slide-and-track type. More particularly, as separately illustrated in FIG. 19, each actuator limb A9 has a track 5 fixedly mounted to the base 1, an actuatable prismatic slider 6 which is slidably mounted to the track 5 and a rigid member 8 linking the slider 6 to the joint assembly J4. The rigid member 8 has a first end mounted to the slider 6 with a universal joint 7. As shown in FIG. 9, the actuator limbs also include an elbow 10 which is mounted to the rigid member 8 by a distal revolute joint 11 to allow rotation of the elbow 10 about a limb axis. The elbows 10 are rotatably mounted to the joint body 415 using the proximal joints 12 allowing rotation about a proximal axis. Each of the rigid members 8 has two non-actuated rotational and one actuated translational degree of freedom whereas each of the elbows 10 has three non-actuated rotational and one actuated translational degree of freedom. In this embodiment, the mechanism 900 does not support the weight of the prismatic sliding track actuator components 5 and 6 and hence the mechanism 900 has light weight and yields high speed performance. This also applies to the aforementioned five and six axis mechanisms when replacing the prismatic devices in the actuator limbs shown in FIGS. 1–6 by a similar slide-and-track device.

Figure 10:
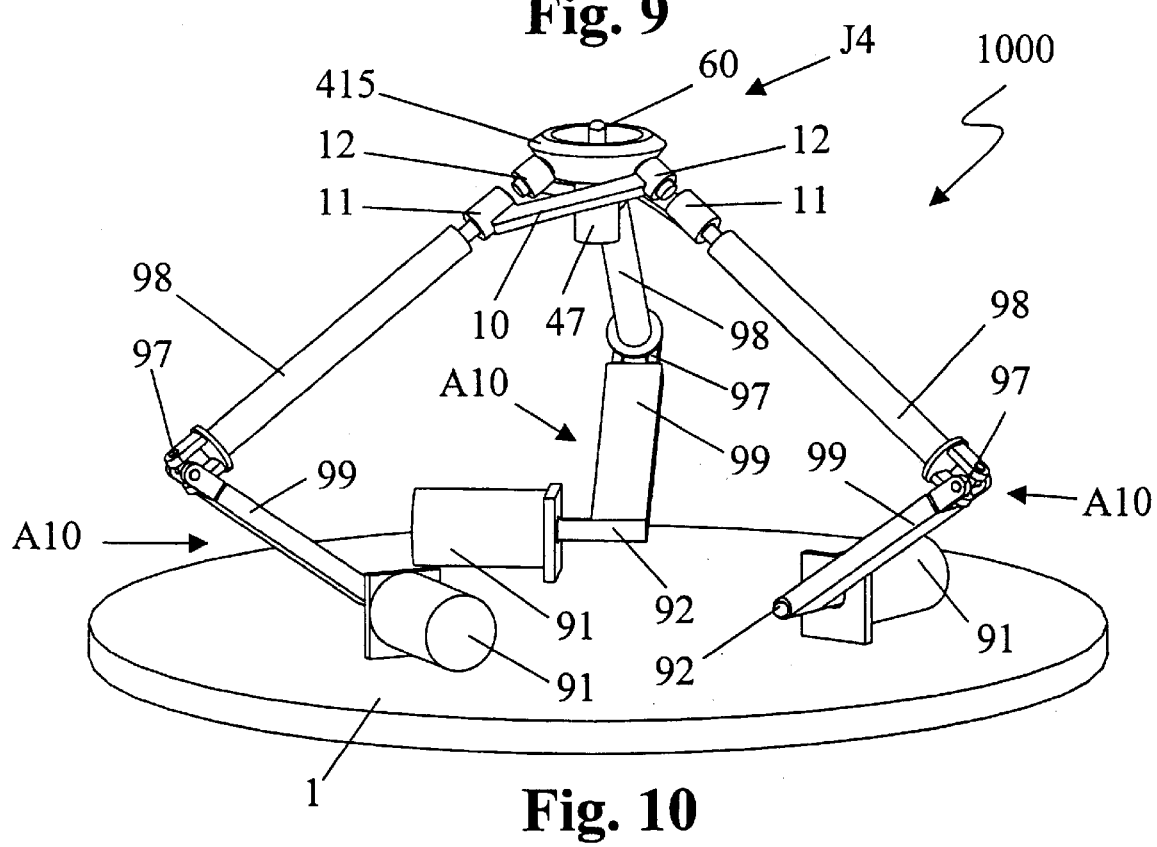

FIG. 10 illustrates a tetrahedral parallel kinematics mechanism 1000 having three actuator limbs A10 each having an elbow configuration. The mechanism 1000 is capable of positioning the work tool 60 with four degrees of freedom.

Figure 20:
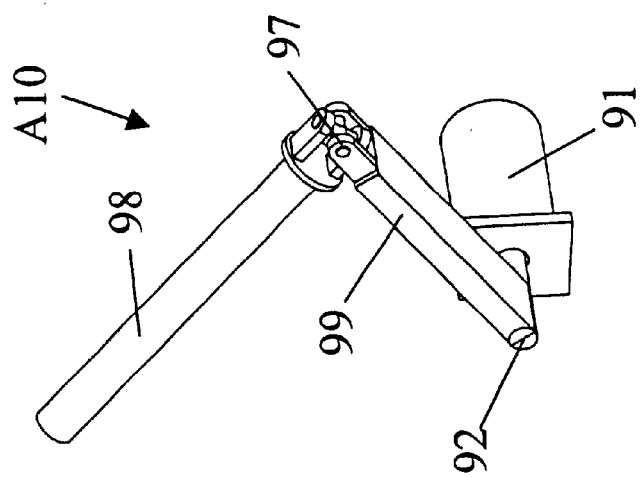
FIG. 20 is a perspective view of an alternative actuator limb embodiment having an elbow linkage structure.

More specifically, as separately illustrated in FIG. 20, each actuator limb A10 has a revolute actuator 91 mounted to the base 1 and an actuator shaft 92. The revolute actuator 92 pivots a first rigid member 99 connected to the shaft 92. A second rigid member 98 has a first end which is movably mounted to the first rigid member 99 by a universal joint 97. As shown in FIG. 10, each actuator limb A10 also comprises an elbow 10 which is mounted to the second end of rigid member 98 by a distal revolute joint 11. The second rigid member 98 of each of the actuator limbs A10 has two non-actuated rotational and one actuated rotational degree of freedom whereas the elbows 10 have three non-actuated rotational and one actuated translational degree of freedom. In this embodiment, the weight of the revolute actuators 91 is supported directly by base 1, not by the movable components of the mechanism 1000, thereby facilitating light weight and high speed performance. This is again true for the aforementioned five and six axis mechanisms when replacing the prismatic devices in the actuator limbs shown in FIGS. 1–6 by a similar elbow configuration or elbow linkage device. Revolute actuators are typically inexpensive, so the embodiment of FIG. 10 is cost effective.

Figure 11:
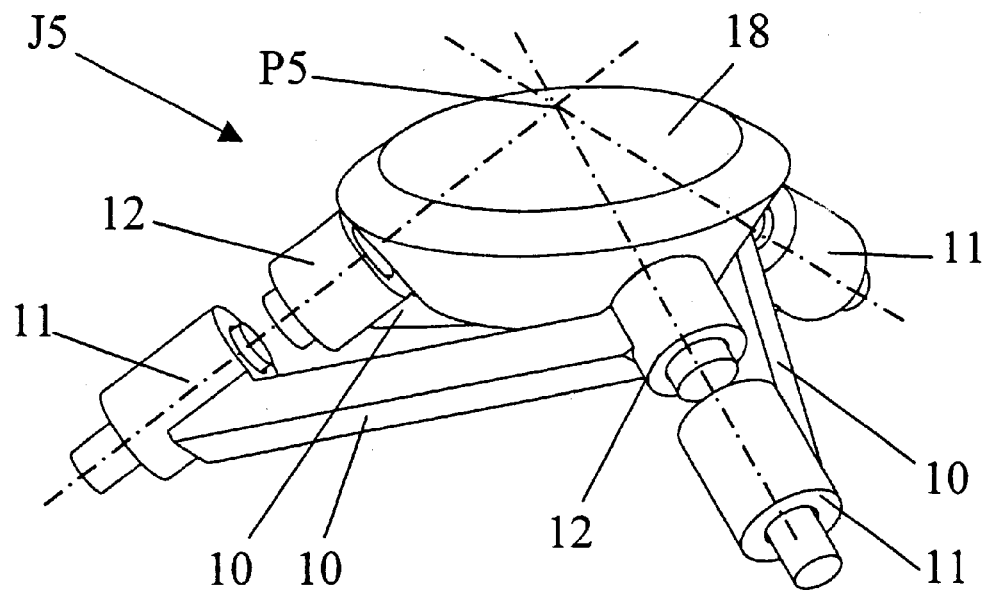
FIG. 11 is a perspective view of a concentric spherical joint assembly constructed in accordance with teachings of the invention, the joint having a joint body, three elbows each having a proximal end pivotably mounted to the body by a respective revolute joint and a distal end with a respective revolute joint for mounting to limbs. The axes of rotation of the respective revolute joints intersect at a point.

Referring to FIG. 11, a concentric spherical joint J5 constructed generally in accordance with teachings of the invention and which may be used in the aforementioned kinematics mechanisms is shown. The concentric spherical joint mechanism J5 includes a circular body 18 and three proximal revolute joints 12, to which three elbows 10 are pivotably mounted. The revolute joints allow rotation of the elbows 10 relative to the body 18 about the longitudinal axis of the respective revolute joints 12. This axis will be referred to as a joint axis. Each elbow also has a distal revolute joint 11 for connecting to a respective limb, allowing rotation about an axis of the respective revolute joint 11 or limb axis. Each limb axis is non-parallel relative to the joint axis of the same elbow 10. The axes of all six revolute joints 11, 12 i.e. the joint axes and the limb axes intersect at a point P5. As a result of this geometry, members or limbs connected to elbows 10 by the distal revolute joints 11 can rotate independent of each other about any axis passing through the intersection point P5. Members or limbs connected to distal revolute joints 11 of the concentric spherical joint assembly J5 behave as if they were connected to each other by means of conventional concentric spherical joints such as ball and socket joints. For example, such a member could be the second member 4 of the actuator limbs A1 to A5 shown in FIG. 1.

Figure 12:
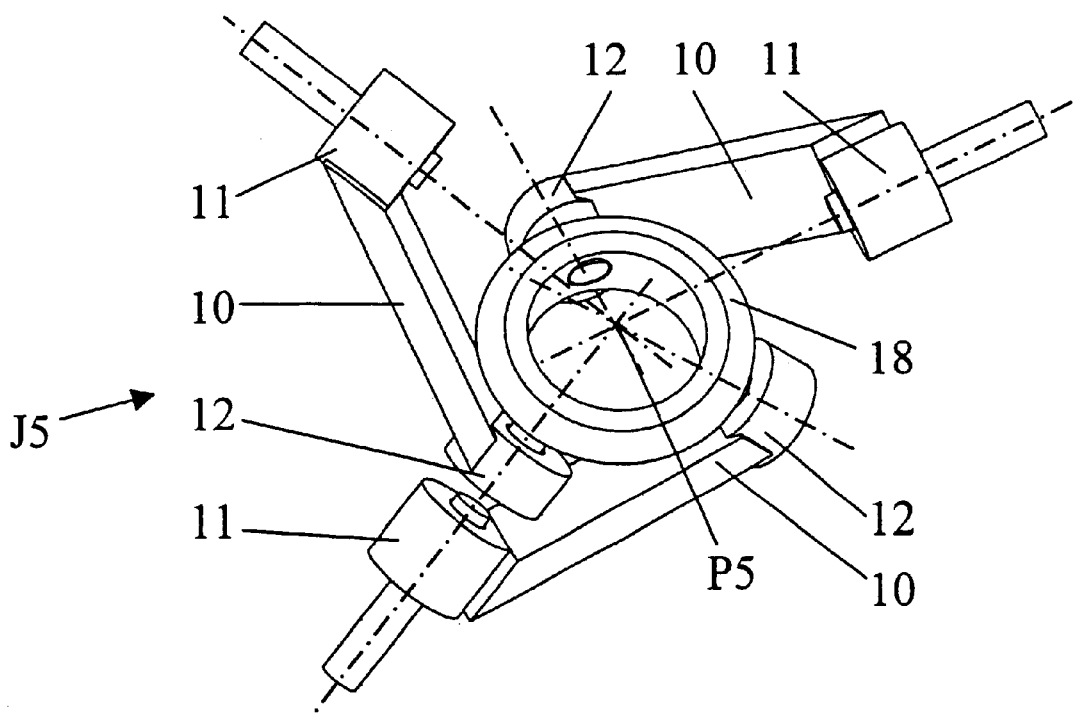
FIG. 12 is a perspective view of the joint assembly of FIG. 11 shown with the elbows in a different orientation.

Demonstrating that the point P5 is invariant with respect to the orientations of the elbows 10, FIG. 12 shows the joint assembly J5 with the elbows in a different orientation than illustrated in FIG. 11. As can be seen from FIG. 12, all of the axes of the revolute joints 11 and 12 still meet at the point P5, although the elbows 10 are in an asymmetric position.

Figure 13:
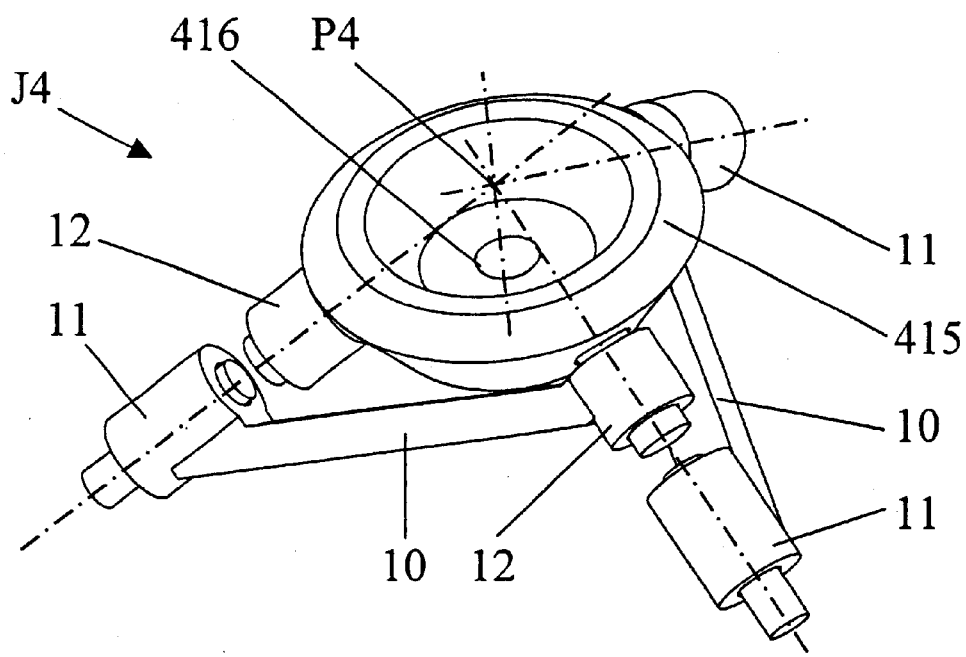
FIG. 13 is a perspective view of another embodiment of a concentric spherical joint assembly constructed in accordance with teachings of the invention, and as used in the embodiment of FIGS. 6, 7, 8, 9 and 10, the joint body having a central revolute joint.

Referring to FIG. 13, a modification J4 of the same concentric spherical joint J5 of FIG. 11 is shown. In addition, a member can be attached by a revolute joint 416 passing through the center of the joint body 415 such that the axis of the revolute joint 416 passes through the intersection point P4. This has been used in many of the aforementioned parallel kinematics mechanisms.

Referring to FIG. 14, the previously described joint assembly J1 is shown in detail. The universal joint 21 is shown mounted to the joint body 15. The universal joint 21 has two axes of rotation which intersect at a common point P1, coincident with the point of intersection of the axes of rotation of the six other revolute joints 11, 12 of the joint assembly J1. The universal joint 21 is mounted to a plate 21a and a stud 21b for connecting to further members or limbs such as member 41 shown in FIG. 1. As an alternative to the joint assembly J3 shown in FIG. 14, a revolute joint added between plate 21a and stud 21b could be used to allow rotation of stud 21b relative to plate 21a about an axis passing through P5. Thus, members connected to the distal revolute joints 11 and the rotatable stud 21b can rotate independent of each other about any axis passing through the point P5. Members connected to the distal revolute joints 11 and the rotatable stud 21b behave as if they were connected to each other by means of conventional concentric spherical joints such as ball and socket joints.

Figure 17:
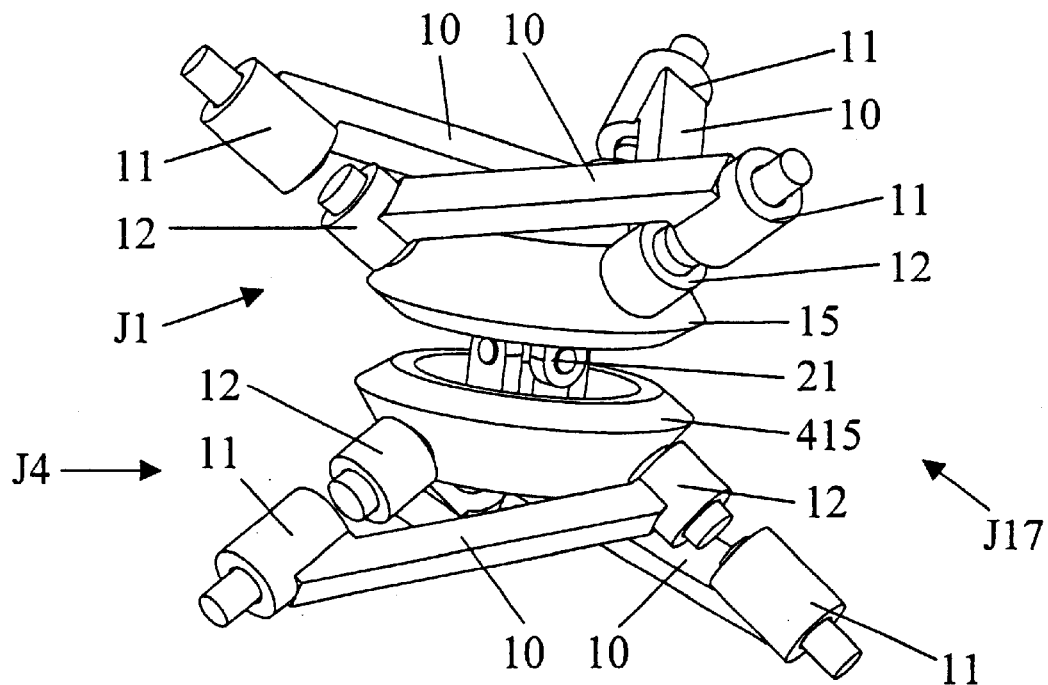
FIG. 17 is a perspective view of another embodiment of a concentric spherical joint assembly constructed in accordance with teachings of the invention, the joint assembly including six elbows connecting six limbs.

To enable the connection of six limbs, FIG. 17 illustrates a concentric spherical joint assembly J17 which is constructed by connecting together the concentric spherical joint assemblies J4 and J1, described above in connection with FIGS. 13 and 14, respectively. The revolute joint 416 inside joint body 415 of joint assembly J4 is rigidly mounted to stud 21b of joint assembly J1 (FIG. 14), allowing joint body 415 three rotational degrees of freedom with respect to joint body 15. In accordance with an embodiment of the invention, the axes of all twelve revolute joints 11, 12 of the joint assembly J17 as well as the center of rotation of the universal joint 21 intersect at the same point irrespective of the orientations of all individual members. Thus, members or limbs connected to the distal revolute joints 11 can rotate independently of each other about any axis passing through the center point, allowing the mechanism the same freedom as six ball joints with a common center point. The joint assembly J17 is useful, for example, in a truss structure for distributing loads among six limbs without causing any bending or twisting moments on limbs connected to the distal revolute joints 11.

Figure 18:
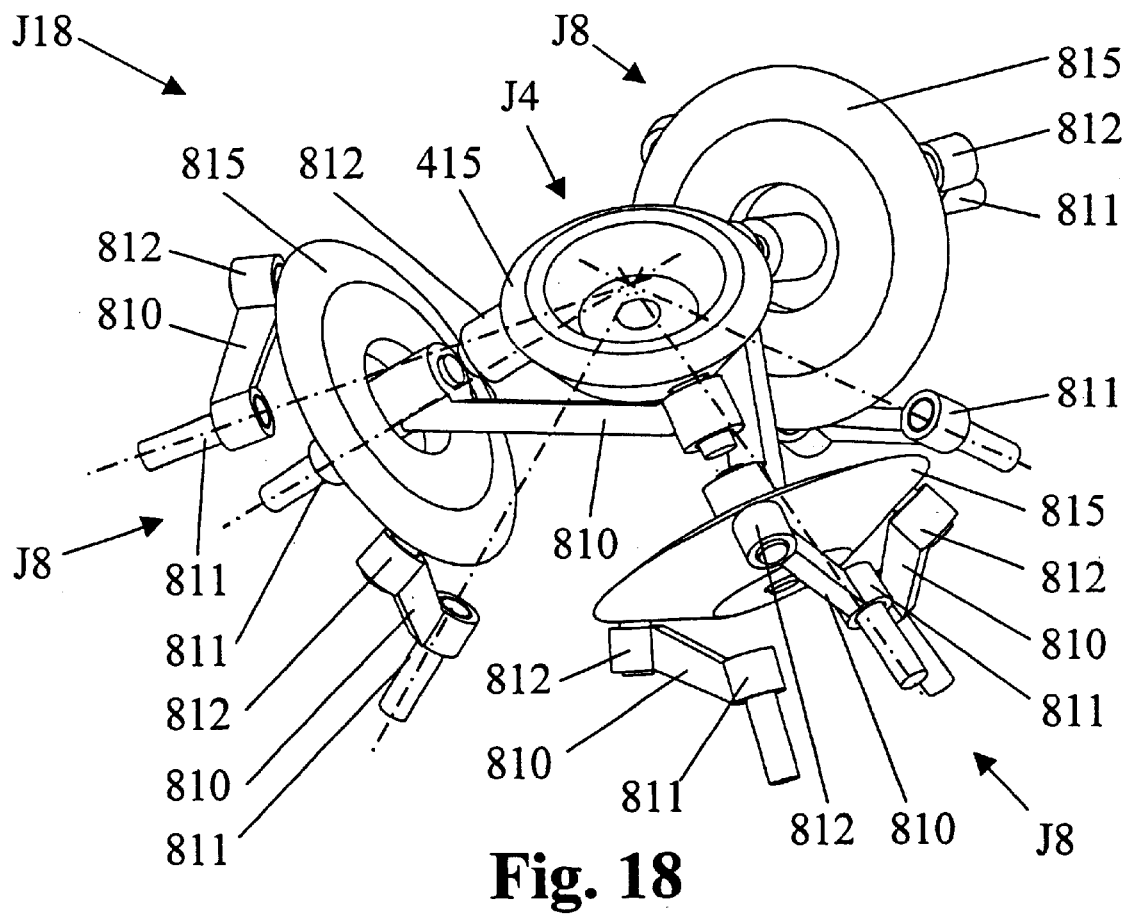
FIG. 18 is a perspective view of another embodiment of a concentric spherical joint assembly constructed in accordance with teachings of the invention, the joint assembly including nine elbows connecting nine limbs.

For joining nine limbs, FIG. 18 illustrates a concentric spherical joint assembly J18 wherein three satellite concentric spherical joint assemblies J8 are mounted to the respective distal revolute joints 11 of the centrally positioned concentric spherical joint assembly J4, previously described independently in connection with FIG. 13. More particularly, each of the satellite joint assemblies J8 includes a satellite joint body 815, three satellite elbows 810 having proximal ends rotatably mounted to the satellite joint body 815 by respective revolute joints 812. Each satellite elbow 815 also has a distal end having a revolute joint 811 for attaching to a satellite limb (not shown). The axes of rotation of all twenty four revolute joints 11, 12, 811, 812 intersect at a common point. Thus, members or limbs connected to the nine distal revolute joints 811 of the three satellite concentric spherical joint assemblies J8 can rotate independent of each other about any axis passing through the common point, thereby allowing the joint assembly J18 the same freedom as nine ball joints with a common center point. The joint assembly J18 is useful, for example, in a truss structure for distributing loads among nine limbs. This embodiment illustrates continuous stacking of satellite joint assemblies to increase the number of limbs rotating about a single common point as well as having complete orientational independence.

FIG. 21 shows an alternative type of prismatic actuator limb A21, which may be used in the aforementioned parallel kinematics mechanisms utilizing the concentric spherical joint described herein in accordance with the invention. The actuator limb A21 includes a ball 96 which is mountable to a fixed base and a socket 95 which is pivotable on the ball 96. The socket 95 is connected to a prismatic cylinder 93 operably assembled with a piston 94, giving the piston 94 three rotational degrees of freedom and an actuated translational degree of freedom. When used as in conjunction with the aforementioned parallel kinematics mechanisms, the actuator limb would also include an elbow (not shown in FIG. 21) mounted to piston 94 in a manner similar to that described in connection with elbow 10 shown in FIG. 1.

Figure 22:
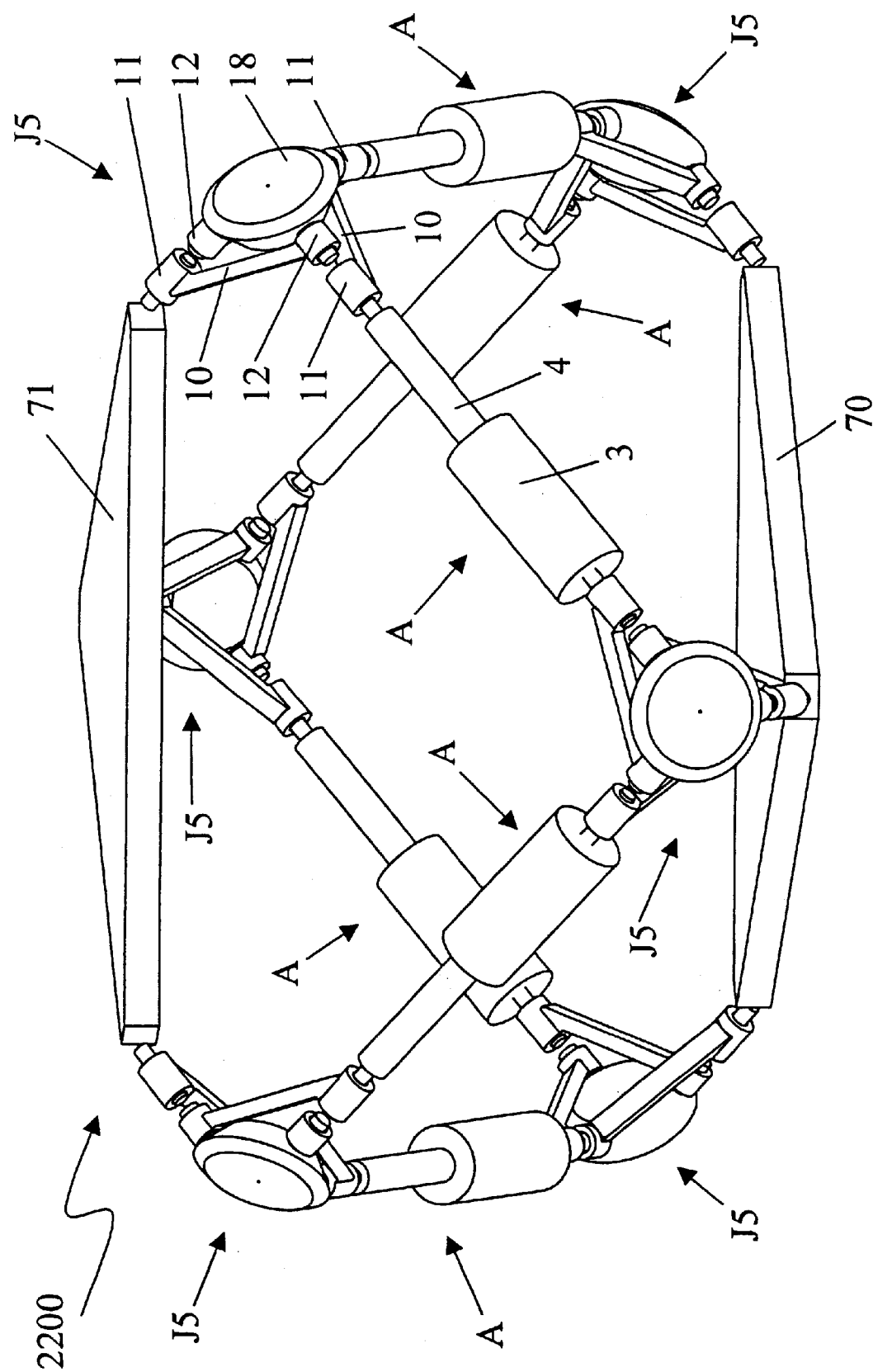
FIG. 22 is a perspective view of a true three-three Stewart platform including six concentric spherical joint assemblies constructed in accordance with teachings of the invention.

The concentric spherical joint assembly disclosed herein can be used to improve otherwise known geometric kinematic structures. The intersecting axes facilitate simpler and direct kinematics solutions. For example, as illustrated in FIG. 22, a mechanism 2200 is based on a three-three Stewart Platform design, which includes concentric spherical joint assemblies J5 (FIG. 11), which are easy to manufacture and work with. The mechanism 2200 includes a base 70 and a movable end member 71 which can be positioned and oriented in space with six degrees of freedom. One of the distal revolute joints 11 of three respective concentric spherical joint assemblies J5 is mounted to the base 1. The remaining two elbows 10 of each of these base-mounted joint assemblies J5 are each respectively connected to a prismatic actuator limb A by the distal revolute joints 11. The movable end member 71 is similarly connected to distal revolute joints 11 of one of the elbows 10 of three additional concentric spherical joint assemblies J5. The remaining two elbows 10 of each of these joint assemblies J5 mounted to the end member 71 are connected to the opposite ends of the prismatic actuator limbs A, such that two elbows 10 of each base-mounted joint assembly J5 are linked to two elbows 10 of two separate movable-end-member-mounted joint assemblies J5.

Although the invention has been described herein in connection with various preferred embodiments, there is no intention to limit the invention to those embodiments. It should be understood that various changes and modifications to the preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A concentric spherical joint assembly connecting at least first, second, and third limb members with three rotational degrees of freedom with respect to each other, the concentric spherical joint assembly comprising:
   at least one joint body; and
   at least three elbows, each elbow having a proximal end and a distal end, the proximal end being mounted to said joint body by means of a proximal revolute joint for rotatable movement about a respective joint axis, the distal end having a distal revolute joint mountable to a respective one of the limb members for rotatable movement about a limb axis, the joint axes and the limb axes of the three elbows intersecting at a common point.

2. A concentric spherical joint assembly according to claim 1, further comprising a fourth limb member movably connected to the joint body, the fourth limb member having three rotational degrees of freedom relative to the joint body.

3. A concentric spherical joint assembly according to claim 2, further comprising a universal joint mounted on the joint body including two revolute joints whose axes intersect at a center point, the universal joint connected to said fourth limb member by a revolute joint allowing rotation about an axis which is non-parallel to said two axes of the universal joint and intersects with the center point.

4. A concentric spherical joint assembly according to claim 3, wherein said center point is coincident with said common point.

5. A concentric spherical joint assembly according to claim 2, further comprising a ball-and-socket joint connecting said joint body to said fourth limb member, allowing relative rotation about a center point.

6. A concentric spherical joint assembly according to claim 5, wherein said center point is coincident with said common point.

7. A concentric spherical joint assembly according to claim 1, hence referred to as the first concentric spherical joint assembly, further comprising a second concentric spherical joint assembly connecting at least fourth, fifth, and sixth limb members with three rotational degrees of freedom with respect to each other, the second concentric spherical joint assembly comprising:
   at least one joint body; and
   at least three elbows, each elbow having a proximal end and a distal end, the proximal end being mounted to said joint body of said second concentric spherical joint assembly by means of a proximal revolute joint for rotatable movement about a respective joint axis, the distal end having a distal revolute joint mountable to a respective one of the fourth, fifth and sixth limb members for rotatable movement about a limb axis, the joint axes and the limb axes of the three elbows of said second concentric spherical joint assembly intersecting at said common point:
   wherein the joint body of the first concentric spherical joint assembly is movably connected to the joint body of the second concentric spherical joint assembly, the joint body of the second concentric spherical joint assembly having three rotational degrees of freedom relative to the joint body of the first concentric spherical joint assembly.

8. The concentric spherical joint assembly according to claim 7, further comprising a universal joint mounted on the joint body of the first concentric spherical joint assembly, the universal joint having two revolute joints with their axes intersecting at a center point, the universal joint being connected to the joint body of the second concentric spherical joint assembly by a revolute joint with its axis being non-parallel to the axes of said universal joint and intersecting with said center point.

9. The concentric spherical joint assembly according to claim 8, where said center point is coincident with said common point.

10. The concentric spherical joint assembly according to claim 7, further comprising a ball-and-socket joint connecting the joint body of the first concentric spherical joint assembly and the joint body of the second concentric spherical joint assembly, allowing the joint body of the second concentric spherical joint assembly to rotate about any axis passing through a center point relative to the joint body of the first concentric spherical joint assembly.

11. The concentric spherical joint assembly according to claim 10, where said center point is coincident with said common point.

12. A concentric spherical joint assembly according to claim 1, further comprising:
   at least three satellite joint assemblies each comprising of
      at least three satellite limb members connected with three degrees of freedom relative to each other;
      a satellite joint body; and
      at least three satellite elbows, each of the satellite elbows having a proximal end and a distal end, the proximal end being mounted to said satellite joint body by means of a proximal revolute joint for rotatable movement about a respective satellite joint axis, the distal end having a distal revolute joint mountable to a respective one of the satellite limb members for rotatable movement about a satellite limb axis, the joint axes and the limb axes of the three satellite elbows intersecting at said common point;
   wherein each of the three satellite joint bodies is rigidly connected to said first, second, and third limb members of the concentric spherical joint assembly respectively.

13. A mechanism for positioning and orienting an end component in space with six degrees of freedom, the mechanism comprising:
   a base;
   an end component;
   six elongate actuator limbs, each of said actuator limbs having a first limb member and a second limb member, the second limb member being actuatably movable relative to the first limb member;
   first, second, third, fourth, fifth, and sixth joint assemblies, each of said joint assembly including:
      a joint body; and
      three elbows, each elbow having a proximal end and a distal end, the proximal end having a proximal revolute joint for mounting the elbow to the joint body for movement about a proximal joint axis, the distal end having a distal revolute joint for mounting limbs allowing movement about a distal joint axis, the proximal and distal joint axes of the tree elbows intersecting at a common point;

wherein the distal revolute joint of one of the elbows of each of the first, second, and third joint assemblies is mounted to said base for revolute movement relative thereto;

wherein the distal revolute joint of one of the elbows of each of the fourth, fifth, and sixth joint assemblies is mounted to said end component for revolute movement relative thereto; and wherein said actuator limbs connect the first, second, and third joint assemblies to the fourth, fifth, and sixth joint assemblies in a manner each of said actuator limbs has said first limb member mounted to a respective one of said distal revolute joints of the first, second, or third joint assemblies and said second limb member mounted to a respective one of said elbows of the fourth, fifth, or sixth joint assemblies such that each of the joint assemblies at the base is connected to two separate joint assemblies at the end component.

14. A mechanism according to claim 13, wherein at least one of the actuator limbs is a prismatic actuator for extending or retracting first and second limb member relatively to each other.

15. A mechanism according to claim 13, wherein at least one of the actuator limbs includes a revolute actuator mounted to the fist limb member and pivotably actuating the second limb member of the same actuator limb, similar to an elbow linkage device.

16. A mechanism for positioning and orienting an end component in space with six degrees of freedom, the mechanism comprising:

a base;

an end component;

six elongate actuator limbs, each of said actuator limbs having a first limb member and a second limb member, the second limb member being actuatably movable relative to the first limb member;

first, second, and third joint assemblies, each of said joint assembly including:

a joint body; and three elbows, each elbow having a proximal end and a distal end, the proximal end having a proximal revolute joint for mounting the elbow to the joint body for movement about a proximal joint axis, the distal end having a distal revolute joint for mounting limbs allowing movement about a distal joint axis, the proximal and distal joint axes of the three elbows intersecting at a common point;

wherein the distal revolute joint of one of the elbows of each of the first, second, and third joint assemblies is mounted to said end component for revolute movement relative thereto; and wherein said actuator limbs connect the first, second, and third joint assemblies to the base in a manner each of said actuator limbs has said first limb member mounted to a respective one of said distal revolute joints of the first, second, or third joint assemblies and the second limb member movably mounted to the base with at least two rotational degrees of freedom relative to the base.

17. A mechanism according to claim 16, wherein at least one of the actuator limbs is a prismatic actuator for extending or retracting first and second limb member relatively to each other.

18. A mechanism according to claim 16, wherein at least one of the actuator limbs includes a revolute actuator mounted to the first limb member and pivotably actuating the second limb member of the same actuator limb, similar to an elbow linkage device.

* * * * *